(12) United States Patent
Tayanaka et al.

(10) Patent No.: US 11,563,904 B2
(45) Date of Patent: Jan. 24, 2023

(54) IMAGING APPARATUS AND IMAGING CONTROL METHOD

(71) Applicant: SONY SEMICONDUCTOR SOLUTIONS CORPORATION, Kanagawa (JP)

(72) Inventors: Hiroshi Tayanaka, Kanagawa (JP); Tomohiro Takahashi, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/058,779

(22) PCT Filed: Feb. 19, 2019

(86) PCT No.: PCT/JP2019/006018
§ 371 (c)(1),
(2) Date: Nov. 25, 2020

(87) PCT Pub. No.: WO2019/234983
PCT Pub. Date: Dec. 12, 2019

(65) Prior Publication Data
US 2021/0144318 A1 May 13, 2021

(30) Foreign Application Priority Data
Jun. 4, 2018 (JP) .............................. JP2018-106673

(51) Int. Cl.
*H04N 5/353* (2011.01)
*H04N 5/345* (2011.01)

(52) U.S. Cl.
CPC ............. *H04N 5/353* (2013.01); *H04N 5/345* (2013.01)

(58) Field of Classification Search
CPC ......... H04N 5/353; H04N 5/345; H04N 5/378
(Continued)

(56) References Cited

U.S. PATENT DOCUMENTS

| 9,832,370 | B2* | 11/2017 | Cho ..................... A61B 5/0037 |
| 2010/0188505 | A1* | 7/2010 | Iwanaga .............. G06K 9/6253 |
| | | | 715/764 |

(Continued)

FOREIGN PATENT DOCUMENTS

| CN | 109155829 A | 1/2019 |
| JP | 2001-103450 A | 4/2001 |

(Continued)

OTHER PUBLICATIONS

International Search Report and Written Opinion of PCT Application No. PCT/JP2019/006018, dated May 14, 2019, 10 pages of ISRWO.

*Primary Examiner* — Lin Ye
*Assistant Examiner* — Chan T Nguyen
(74) *Attorney, Agent, or Firm* — Chip Law Group

(57) ABSTRACT

Only a necessary region is imaged on the basis of a result of interleaving imaging. An imaging apparatus includes an imaging element, an analog-to-digital converter, and a conversion control unit. The imaging element generates analog signals of a plurality of pixels for a plurality of pixel blocks each including a plurality of pixels. The analog-to-digital converter performs analog-to-digital conversion processing for converting an analog signal into a digital signal. The conversion control unit controls the analog-to-digital conversion processing of a plurality of pixels included in a predetermined pixel block according to a difference between a digital signal of a representative pixel in the predetermined pixel block in the plurality of pixel blocks and a predetermined reference value.

13 Claims, 20 Drawing Sheets

(58) Field of Classification Search
USPC .......................................................... 348/302
See application file for complete search history.

(56) References Cited

U.S. PATENT DOCUMENTS

| | | | | |
|---|---|---|---|---|
| 2015/0372688 | A1* | 12/2015 | Hashimoto | ........... H03M 1/002 |
| | | | | 341/158 |
| 2016/0094800 | A1* | 3/2016 | Gousev | ............ H04N 5/232411 |
| | | | | 348/310 |
| 2018/0077374 | A1* | 3/2018 | Takahashi | ............ H04N 5/3454 |
| 2018/0084210 | A1 | 3/2018 | Chida et al. | |
| 2018/0309948 | A1 | 10/2018 | Harada | |
| 2019/0327440 | A1* | 10/2019 | Hoshino | ................ H04N 5/343 |
| 2020/0036883 | A1* | 1/2020 | Lee | ........................ H04N 5/353 |

FOREIGN PATENT DOCUMENTS

| | | | | |
|---|---|---|---|---|
| JP | 2010-171666 | A | 8/2010 | |
| JP | 2016-092470 | A | 5/2016 | |
| JP | 2016-184843 | * | 10/2016 | ............ H04N 5/378 |
| JP | 2016-184843 | A | 10/2016 | |
| JP | 2016-187072 | A | 10/2016 | |
| JP | 2016-219949 | * | 12/2016 | ............ H04N 5/232 |
| JP | 2016-219949 | A | 12/2016 | |
| WO | 2016/147508 | A1 | 9/2016 | |
| WO | 2017/209221 | A1 | 12/2017 | |

* cited by examiner

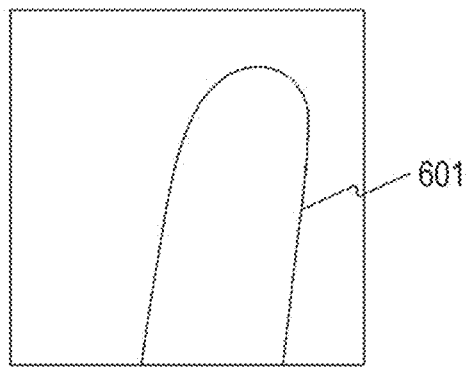

INTERLEAVING
IMAGING MEMORY

DETECT DECIDED VALUES
IN H DIRECTION AND
V DIRECTION

DECISION ( DECISION IS MADE AS
  GRADATION = 100 OR MORE )

IMAGING

IMAGING APPARATUS AND IMAGING CONTROL METHOD

CROSS REFERENCE TO RELATED APPLICATIONS

This application is a U.S. National Phase of International Patent Application No. PCT/JP2019/006018 filed on Feb. 19, 2019, which claims priority benefit of Japanese Patent Application No. JP 2018-106673 filed in the Japan Patent Office on Jun. 4, 2018. Each of the above-referenced applications is hereby incorporated herein by reference in its entirety.

TECHNICAL FIELD

The present technology relates to an imaging apparatus. More specifically, the present technology relates to an imaging apparatus for performing interleaving imaging and an imaging control method.

BACKGROUND ART

There is known a conventional imaging apparatus having an interleaving imaging mode for reducing power consumption and the like. For example, a driving method of a solid-state imaging element has been proposed in which interleaving reading is performed when moving object detection is performed, and full-screen reading is performed when motion has been detected (for example, see Patent Document 1).

CITATION LIST

Patent Document

Patent Document 1: Japanese Patent Application Laid-Open No. 2010-171666

SUMMARY OF THE INVENTION

Problems to be Solved by the Invention

In the above-mentioned conventional technology, moving object detection is performed by interleaving reading, and event-driven full-screen reading is performed upon detection of motion. However, in this conventional technology, since imaging is performed by all the pixels of the imaging element when an image is captured after interleaving reading, there are problems that power consumption increases, the amount of data increases, and the band of data transfer increases. On the other hand, as a practical use, in some cases, it is sufficient if only a part of a screen can be clearly imaged, such as in face recognition and object recognition, and imaging of the entire screen is wasted in such a case.

The present technology has been created in view of such a situation, and an object thereof is to image only a necessary region on the basis of the result of interleaving imaging.

Solutions to Problems

The present technology has been made to solve the above-mentioned problems, and a first aspect thereof is an imaging apparatus including: an imaging element that generates, for a plurality of pixel blocks each including a plurality of pixels, an analog signal of the plurality of pixels; an analog-to-digital converter that performs analog-to-digital conversion processing for converting the analog signal into a digital signal; and a conversion control unit that controls the analog-to-digital conversion processing of the plurality of pixels included in a predetermined pixel block according to a difference between the digital signal of a representative pixel in the predetermined pixel block of the plurality of pixel blocks and a predetermined reference value. Therefore, the effect of controlling the analog-to-digital conversion processing of a plurality of pixels included in a predetermined pixel block according to a difference between a digital signal of a representative pixel in a plurality of pixel blocks and a reference value is obtained.

Furthermore, in the first aspect, the conversion control unit may perform control such that, for a first pixel block in which a difference between the digital signal of the representative pixel and the reference value is a predetermined threshold or more, the analog-to-digital conversion processing of the plurality of pixels included in the first pixel block is performed by the analog-to-digital converter to generate the digital signal of the plurality of pixels, and for a second pixel block in which a difference between the digital signal of the representative pixel and the reference value is less than the threshold, the analog-to-digital conversion processing of the plurality of pixels included in the second pixel block is not performed by the analog-to-digital converter. Therefore, the effect of controlling the necessity of analog-to-digital conversion processing according to the difference between the digital signal of the representative pixel and the reference value is obtained.

Furthermore, in the first aspect, the conversion control unit may perform control such that, even in the second pixel block in which a difference between the digital signal of the representative pixel and the reference value is less than the threshold, if a difference between the digital signal of the representative pixel and the reference value in a pixel block in the periphery of the second pixel block is the threshold or more, the analog-to-digital conversion processing of the plurality of pixels included in the second pixel block is performed by the analog-to-digital converter to generate the digital signal of the plurality of pixels. Therefore, the effect of controlling the analog-to-digital conversion processing in an extended manner to a pixel block in the periphery of the pixel block is obtained.

Furthermore, in the first aspect, the conversion control unit may include an imaging mode switching unit that performs switching between an interleaving imaging mode in which the analog-to-digital conversion processing is performed to generate the digital signal by the analog-to-digital converter for only the representative pixel of the plurality of pixel blocks, and a region control imaging mode in which the analog-to-digital conversion processing of the plurality of pixels included in the predetermined pixel block is performed by the analog-to-digital converter according to the difference between the digital signal of the representative pixel and the reference value. Therefore, the effect of switching between the interleaving imaging mode and the region control imaging mode is obtained.

Furthermore, in the first aspect, the conversion control unit may include an interleaving decision unit that outputs, as a decision result, coordinates of a pixel block in which a difference between the digital signal of the representative pixel generated in the interleaving imaging mode and the reference value is a predetermined threshold or more, and a coordinate setting unit that sets coordinates of the pixel block for which the analog-to-digital conversion processing is performed in the region control imaging mode on the basis of the decision result. Therefore, the effect of setting coordinates for the region control imaging mode according to the difference between the digital signal of the representative pixel generated in the interleaving imaging mode and the reference value is obtained.

Furthermore, in the first aspect, the conversion control unit may control an exposure time of the plurality of pixels included in the predetermined pixel block in the region control imaging mode on the basis of the digital signal of the representative pixel generated in the interleaving imaging mode. Therefore, the effect of controlling the exposure time in the region control imaging mode on the basis of the digital signal of the representative pixel generated in the interleaving imaging mode is obtained.

Furthermore, in the first aspect, the conversion control unit may perform operation by the region control imaging mode at a frame rate different from that of the interleaving imaging mode, on the basis of the digital signal of the representative pixel generated in the interleaving imaging mode for a plurality of moving image frames arrayed in time series. Therefore, the effect of performing operation by the region control imaging mode at a different frame rate on the basis of the digital signal of the representative pixel generated in the interleaving imaging mode is obtained.

Furthermore, in the first aspect, the reference value may be a preset fixed value, or a value set from the values of corresponding pixels in the moving image frames arrayed in time series.

Furthermore, in the first aspect, the analog-to-digital converter may be a pixel ADC type that performs the analog-to-digital conversion processing in units of a pixel correspondingly to each of the pixels. Furthermore, the analog-to-digital converter may be an area ADC type that performs the analog-to-digital conversion processing in units of a region in which a plurality of the pixels is collected. Furthermore, the analog-to-digital converter may be a column ADC type that performs the analog-to-digital conversion processing in units of a column with the pixels grouped in each column.

Furthermore, in the first aspect, the imaging element may generate the analog signal by nondestructive reading.

Furthermore, a second aspect of the present technology is an imaging control method in an imaging apparatus, the imaging apparatus including an imaging element that generates, for a plurality of pixel blocks each including a plurality of pixels, an analog signal of the plurality of pixels, and an analog-to-digital converter that performs analog-to-digital conversion processing for converting the analog signal into a digital signal, the imaging control method including: an interleaving imaging step of causing the analog-to-digital converter to perform the analog-to-digital conversion processing only for a representative pixel in the plurality of pixel blocks to generate the digital signal; and a region control imaging step of causing the analog-to-digital converter to perform the analog-to-digital conversion processing of the plurality of pixels included in a predetermined pixel block according to a difference between the digital signal of the representative pixel and a predetermined reference value. Therefore, the effect of controlling the analog-to-digital conversion processing of a plurality of pixels included in a predetermined pixel block in the region control imaging according to a difference between a digital signal of a representative pixel in a plurality of pixel blocks and a reference value in the interleaving imaging is obtained.

Furthermore, in the second aspect, an exposure time of the plurality of pixels included in the predetermined pixel block in the region control imaging step may be controlled on the basis of the digital signal of the representative pixel generated in the interleaving imaging step. The effect of controlling the exposure time in the region control imaging on the basis of the digital signal of the representative pixel generated in the interleaving imaging is obtained.

Effects of the Invention

According to the present technology, an excellent effect of capable of imaging only a necessary region on the basis of the result of interleaving imaging can be obtained. Note that the effects described herein are not necessarily limited, and any of the effects described in the present disclosure may be applied.

BRIEF DESCRIPTION OF DRAWINGS

FIGS. 8A, 8B, and 8C are diagrams showing a specific example of interleaving imaging and region control imaging in a second embodiment of the present technology.

FIGS. 10A and 10B are diagrams showing a specific example of interleaving imaging and region control imaging in a third embodiment of the present technology.

FIG. 20 is a diagram showing an example of a field to which an embodiment of the present technology is applied.

MODE FOR CARRYING OUT THE INVENTION

Hereinafter, modes (hereinafter referred to as embodiments) for implementing the present technology will be described. The description will be given in the following order.

1. First embodiment (example of performing analog-to-digital conversion processing in pixel units)
2. Second embodiment (example of performing analog-to-digital conversion processing in area units)
3. Third embodiment (example of performing analog-to-digital conversion processing in column units)
4. Fourth embodiment (application example of moving image frame)
5. Fifth embodiment (example of estimating coordinates)
6. Sixth embodiment (example of nondestructive reading)
7. Application example

1. First Embodiment

[Imaging Apparatus]

Figure 1:
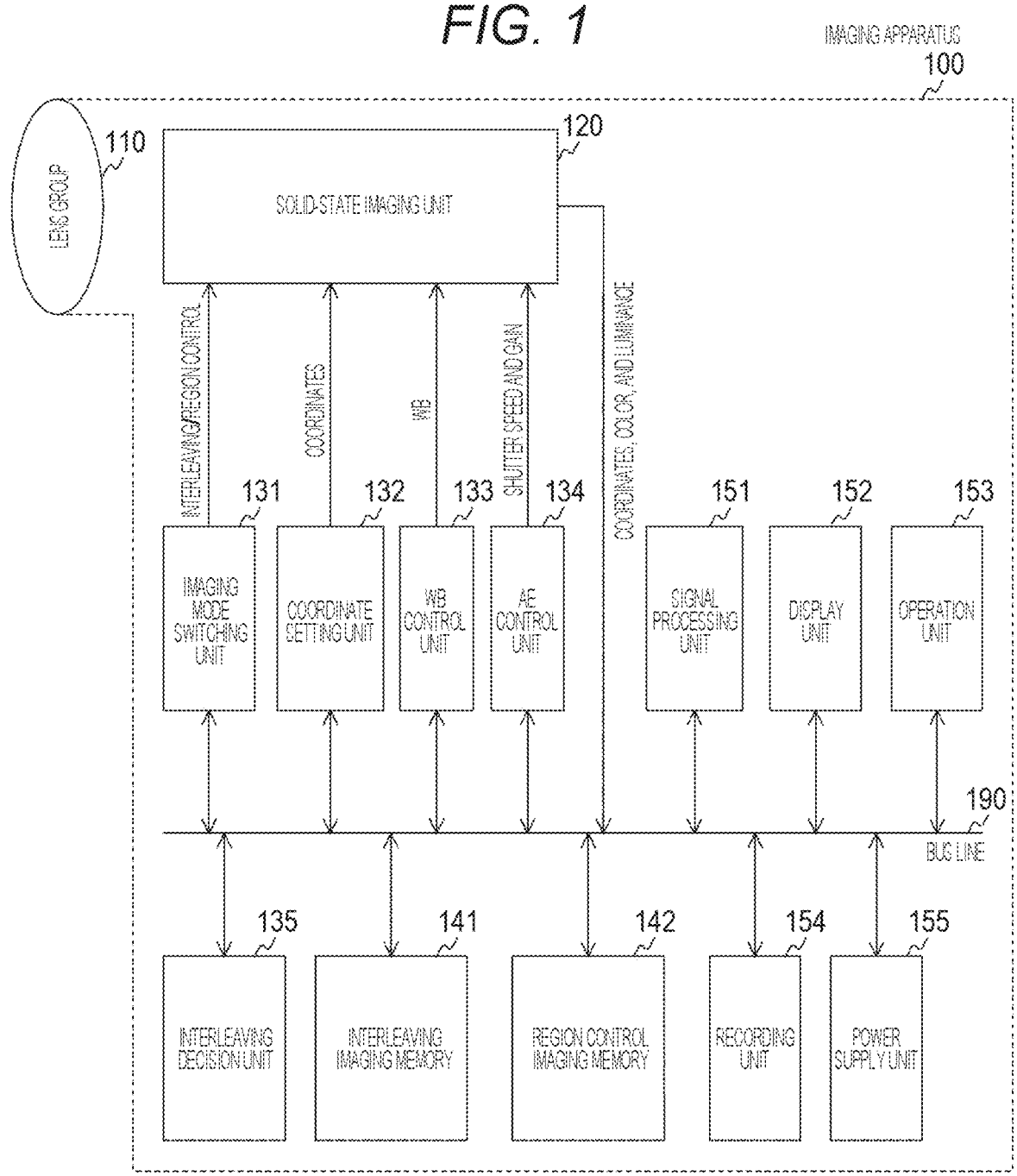
FIG. 1 is a diagram showing a configuration example of an imaging apparatus 100 in an embodiment of the present technology.

FIG. 1 is a diagram showing a configuration example of an imaging apparatus 100 in an embodiment of the present technology.

The imaging apparatus 100 includes a lens group 110, a solid-state imaging unit 120, an imaging mode switching unit 131, a coordinate setting unit 132, a white balance control unit 133, an auto exposure control unit 134, and an interleaving decision unit 135. Furthermore, the imaging apparatus 100 includes an interleaving imaging memory 141, a region control imaging memory 142, a signal processing unit 151, a display unit 152, an operation unit 153, a recording unit 154, and a power supply unit 155. These are connected by a bus line 190.

The lens group 110 is an optical system element that focuses light incident from a subject and forms an image. The solid-state imaging unit 120 is a semiconductor element that captures an image of a subject formed by the lens group 110.

The imaging mode switching unit 131 selects one of the interleaving imaging mode and the region control imaging mode as the imaging mode in the solid-state imaging unit 120 and performs switching to the selected mode. Here, the interleaving imaging mode is a mode of imaging a pixel by performing interleaving in the solid-state imaging unit 120. The region control imaging mode is a mode of imaging only a designated region in the solid-state imaging unit 120.

The coordinate setting unit 132 sets the coordinates necessary for imaging in the solid-state imaging unit 120. In the interleaving imaging mode, the coordinates for which interleaving imaging is desired are set. On the other hand, in the region control imaging mode, the coordinates for which the region control imaging has been performed are set.

The white balance control unit 133 determines a white balance (WB) from color signals in the interleaving imaging mode and the region control imaging mode.

The auto-exposure control unit 134 performs automatic exposure (AE) control for automatically determining a shutter speed and a gain from a luminance signal in the interleaving imaging mode and the region control imaging mode, and causes the result to be applied to imaging conditions of the solid-state imaging unit 120.

The interleaving decision unit 135 determines an output value of the luminance signal imaged in the interleaving imaging mode, and outputs the coordinates of the predetermined conditions.

Note that the imaging mode switching unit 131, the coordinate setting unit 132, the WB control unit 133, the AE control unit 134, and the interleaving decision unit 135 are examples of the conversion control unit described in the claims.

The interleaving imaging memory 141 is a memory that stores the coordinates determined by the interleaving imaging and the luminance signal and color signal at the coordinates. The region control imaging memory 142 is a memory that stores coordinates for which imaging is performed in the region control imaging mode and a luminance signal and a color signal of the coordinates. Note that the interleaving imaging memory 141 and the region control imaging memory 142 may be physically configured by the same memory. Furthermore, these may be configured by a line memory or a frame memory, for example.

The signal processing unit 151 performs predetermined signal processing on the signal imaged by the solid-state imaging unit 120. The display unit 152 displays the image signal that has been subjected to the signal processing by the signal processing unit 151. The operation unit 153 receives an operation input by the user. The recording unit 154 records the captured image signal on a predetermined recording medium. The power supply unit 155 supplies power to each unit of the imaging apparatus 100.

Figure 2:
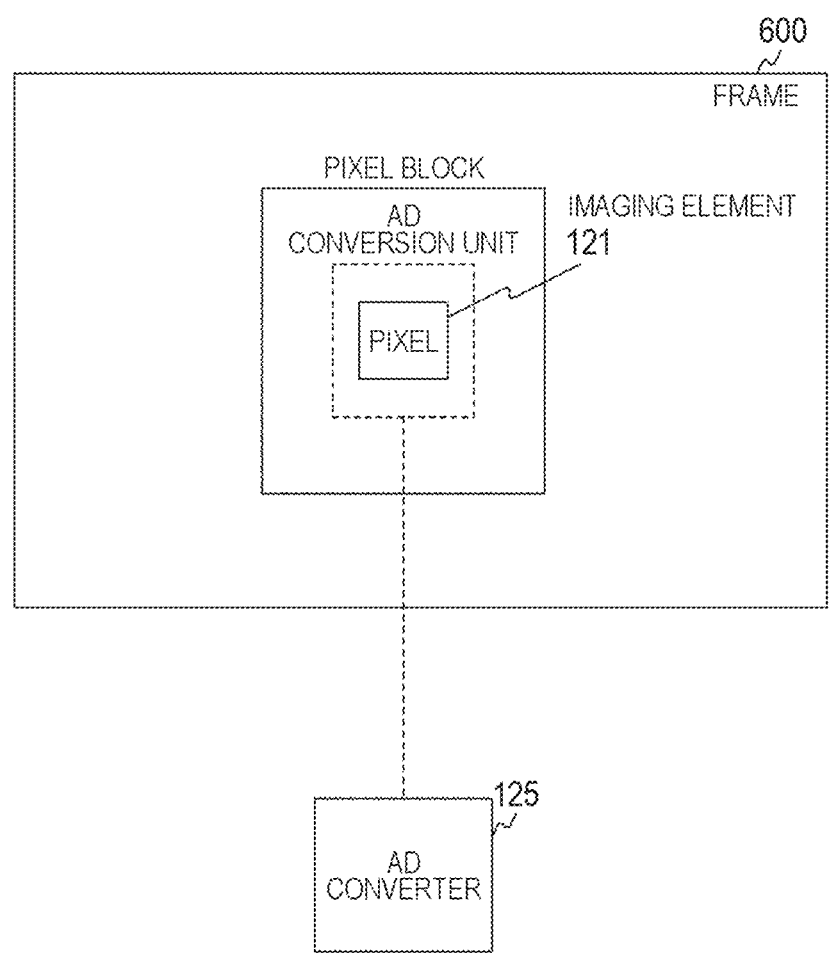
FIG. 2 is a diagram showing a relationship between an analog-to-digital converter 125 and a pixel in a solid-state imaging unit 120 of the embodiment of the present technology.

FIG. 2 is a diagram showing a relationship between an analog-to-digital converter 125 and a pixel in the solid-state imaging unit 120 of the embodiment of the present technology.

The solid-state imaging unit 120 includes an imaging element 121 in which a plurality of pixels corresponding to a frame 600 is arranged in a plane. Each of the pixels of the imaging element 121 includes, for example, a photodiode serving as a photoelectric conversion unit and a plurality of pixel transistors. The pixels of the imaging element 121 are divided into a plurality of pixel blocks. Then, each of the plurality of pixel blocks includes a plurality of pixels.

The output of the imaging element 121 is an analog signal, and an electronic circuit handles the analog signal. Therefore, analog-to-digital conversion processing for converting the analog signal into a digital signal is required. An analog-to-digital (AD) converter 125 performs this analog-to-digital conversion processing. There are several possible correspondences between the pixels in the imaging element 121 and the AD converters 125, and they have been proposed so far.

Firstly, a method of assigning one AD converter 125 to one pixel is conceivable. Hereinafter, this is referred to as a pixel analog-to-digital converter (ADC) type. Secondly, a method of assigning a plurality of pixels included in a rectangular area on a plane to one AD converter 125 is conceivable. Hereinafter, this is referred to as an area ADC type. Thirdly, a method of assigning a plurality of pixels arranged in an array to one AD converter 125 in units of a column is conceivable. Hereinafter, this is referred to as a column ADC type. In the first embodiment below, description will be given assuming a pixel ADC type. Other ADC types will be sequentially described in other embodiments.

[Drive System]

In each of the embodiments below, imaging is performed by repeating the interleaving imaging mode and the region control imaging mode.

In the interleaving imaging mode, imaging is performed only with the coordinates for which interleaving imaging is desired. The luminance signal and the color signal of the coordinates for which interleaving imaging has been performed in the solid-state imaging unit 120 are stored in the interleaving imaging memory 141. The interleaving decision unit 135 determines the value of the luminance signal and determines the coordinates. The determined coordinates are stored in the interleaving imaging memory 141.

In the region control imaging mode, the coordinates in the region control imaging mode are determined on the basis of the coordinates determined by the interleaving decision unit 135. At this time, as the coordinates in the region control imaging mode, surrounding coordinates are also added according to the ADC type, as described later.

In this region control imaging mode, AE control is performed in each pixel and each area using the luminance signal captured in the interleaving imaging mode, and the shutter speed and gain are determined. At this time, in the area ADC type, the luminance signal photographed by one pixel in the area in the interleaving imaging mode is used for the AE control of the area. Furthermore, in the pixel ADC type, the luminance signal captured in the interleaving imaging mode is used for the AE control in a pixel in the vicinity of the pixel. Furthermore, in the column ADC type, the luminance signal photographed by one pixel in the area in the interleaving imaging mode is used for the AE control of the area.

Furthermore, in the region control imaging mode, WB control is performed in each pixel and each area using the luminance signal captured in the interleaving imaging mode, and the color temperature is determined.

The coordinates, the luminance signal, and the color signal captured in the region control imaging in the region control imaging mode are stored in the region control imaging memory 142.

As described above, the signals stored in the interleaving imaging memory 141 and the region control imaging memory 142 are transferred from the signal processing unit 151 to the recording unit 154, the display unit 152, the operation unit 153, and the like.

[Interleaving Imaging and Region Control Imaging]

Figure 3A:
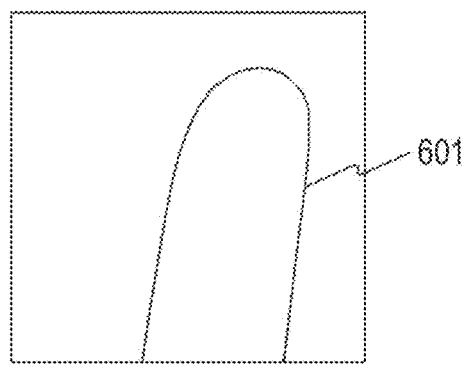
FIGS. 3A, 3B, and 3C are diagrams showing a specific example of interleaving imaging and region control imaging in the first embodiment of the present technology.
Figure 3B:
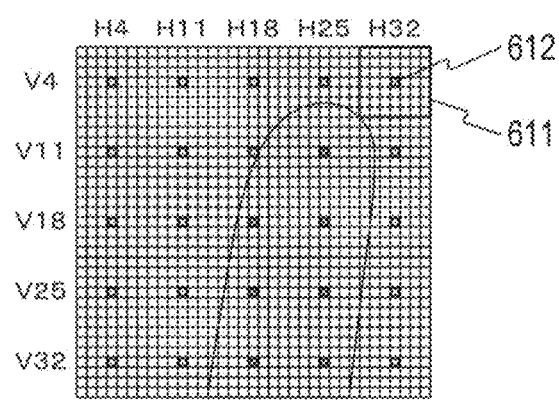
Figure 3C:
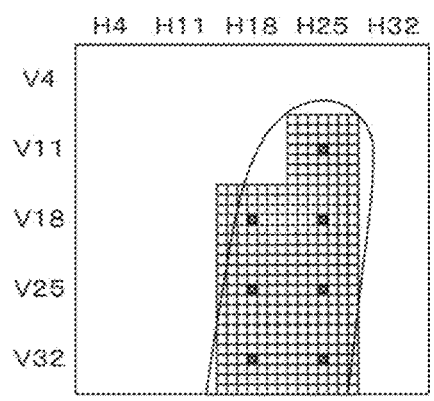

FIGS. 3A, 3B, and 3C are diagrams showing a specific example of interleaving imaging and region control imaging in a first embodiment of the present technology.

In this example, it is assumed that a scene of a finger 601 is imaged, as indicated by FIG. 3A. Furthermore, in the first embodiment, the above-described pixel ADC type imaging apparatus is assumed.

First, in the interleaving imaging mode, as shown in FIG. 3B, as an example, in a pixel block 611 of seven pixels× seven pixels, the coordinates are set so that one pixel 612 at the center thereof is imaged as a representative pixel. As described above, one interleaving imaging is performed for 49 pixels. That is, the coordinates are set every seven pixels in the vertical direction, and every seven pixels in the horizontal direction.

After setting the coordinates, imaging is performed at, for example, 1000 fps (frames/second). Then, the captured image is stored in the interleaving imaging memory 141.

Then, the luminance signal is extracted from the interleaving imaging memory 141. Here, it is assumed that the luminance signal is a gradation of 1024 steps from "0" to "1023". As an example, it is assumed that a signal of "50" gradation is obtained in a dark scene and a signal of "500" gradation is obtained in a bright place. Then, the coordinates smaller than the "100" gradation and the coordinates larger than the "100" gradation are determined. Therefore, the coordinates and the luminance value higher than the "100" gradation are determined as the center value of the region control imaging, and are stored in the interleaving imaging memory 141. Note that, in this embodiment, it is assumed that the coordinates are stored in the interleaving imaging memory 141, but the coordinates may be temporarily stored in another memory.

In this example, the background "50" gradation is used as the reference value, and the comparison threshold is assumed to be "50" gradation. That is, the difference between the reference value ("50") and the captured luminance signal is generated, and if the difference is the threshold ("50") or more, the gradation is "100" or more and the object is detected.

Next, in the region control imaging mode, the coordinates of the region control imaging are set from the interleaving imaging memory 141. Therefore, the analog-to-digital conversion processing of the pixels included in the pixel block in the region control imaging is controlled in accordance with the difference between the digital signal of the representative pixel of the pixel block obtained by the interleaving imaging and the reference value.

That is, for a pixel block in which the difference between the digital signal of the representative pixel and the reference value is the threshold or more, the analog-to-digital conversion processing of the pixels included in the pixel block is performed to generate the digital signal. On the other hand, for a pixel block in which the difference between the digital signal of the representative pixel and the reference value is less than the threshold, the analog-to-digital conversion processing of the pixels included in the pixel block is not performed.

For the coordinates in this case, three pixels are set in each of the horizontal direction and the vertical direction from the central pixel 612 so that the coordinates include seven pixels×seven pixels, as indicated by FIG. 3C.

Then, the luminance signal is read from the interleaving imaging memory 141, and the shutter speed and the gain are set by the AE control on the seven pixels×seven pixels.

After setting the coordinates, imaging is performed at, for example, 1000 fps. Then, the captured image is stored in the region control imaging memory 142. From the region control imaging memory 142, coordinates, a luminance signal, and a color signal are output.

Figure 4A:
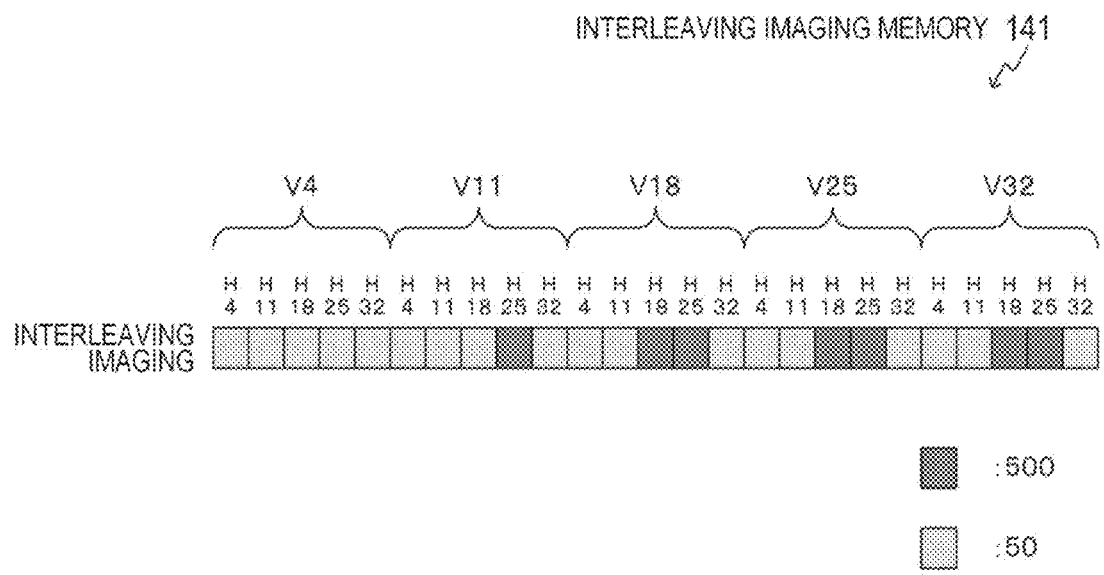
FIGS. 4A and 4B are diagrams showing a specific example of the interleaving imaging and determination in the first embodiment of the present technology.
Figure 4B:
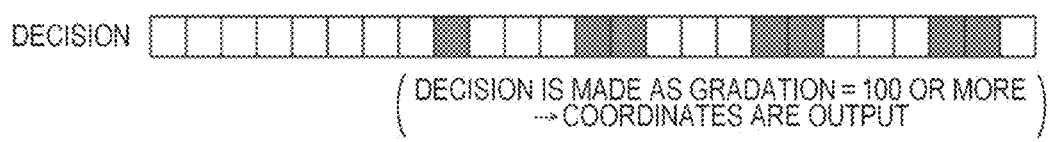

FIGS. 4A and 4B are diagrams showing a specific example of the interleaving imaging and determination in the first embodiment of the present technology.

By the interleaving imaging, a luminance signal is obtained in the interleaving imaging memory 141 as indicated by FIG. 4A. In this example, only the central pixel 612 of seven pixels×seven pixels is subjected to interleaving imaging as a representative pixel and the image is stored with the luminance signal. As described above, it is assumed that a signal of "50" gradation is obtained in a dark scene and a signal of "500" gradation is obtained in a bright place. Then, as indicated by FIG. 4B, the coordinates of "100" gradation or higher are determined and the coordinates are set.

Figure 5A:
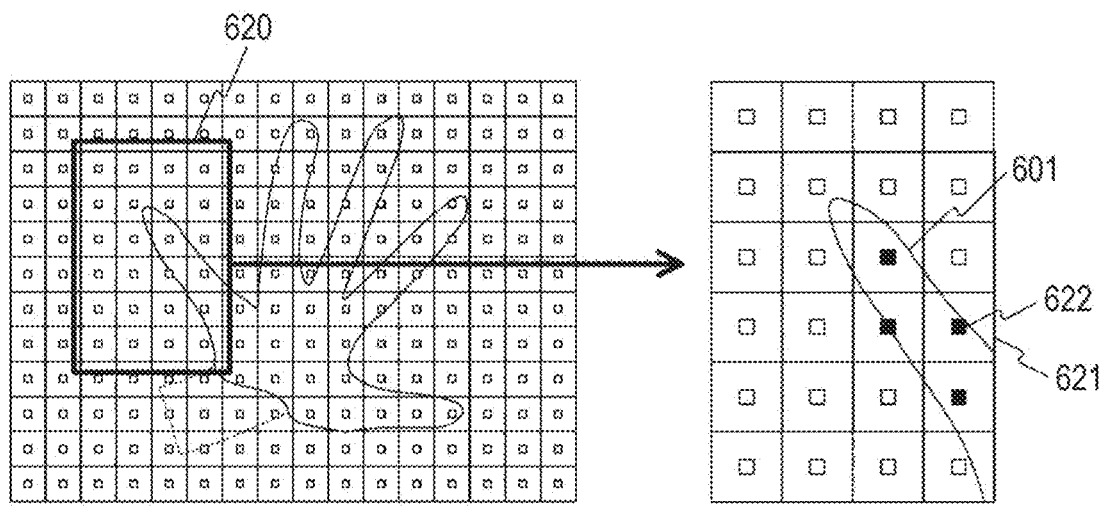
FIGS. 5A and 5B are diagrams showing a specific example of enlargement of an imaging region in region control imaging in the first embodiment of the present technology.
Figure 5B:
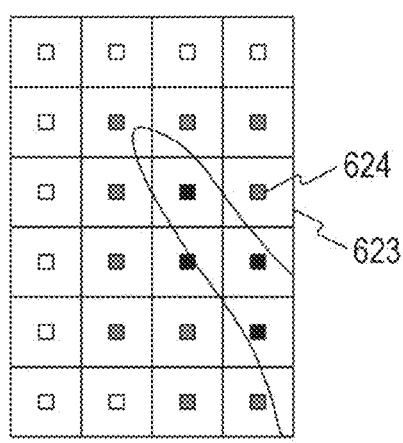

FIGS. 5A and 5B are diagrams showing a specific example of enlargement of an imaging region in region control imaging in the first embodiment of the present technology.

As indicated by FIG. 5A, when imaging the entire hand, the imaging region is enlarged in the region control imaging. For example, focusing on the region 620 surrounding the finger 601, in the determination method as described above, the pixel block 621 is determined on the basis of the gradation of the central pixel 622, so that part of the finger 601 may not be imaged in the region control imaging if it remains as it is.

Therefore, in order to eliminate this, the periphery of the detected region is added to the coordinates. For example, as indicated in FIG. 5B, the coordinates are set to be extended to the pixel block 623 in the periphery of the pixel block 621 determined by the gradation. That is, even in the pixel block 623 in which the luminance signal of the central pixel 624 is less than "100" gradation, if the luminance signal of the central pixel 622 of the pixel block 621 in the vicinity of the pixel block 623 has "100" gradation or higher, the pixel block 623 is considered as the target of the region control imaging.

Figure 6A:
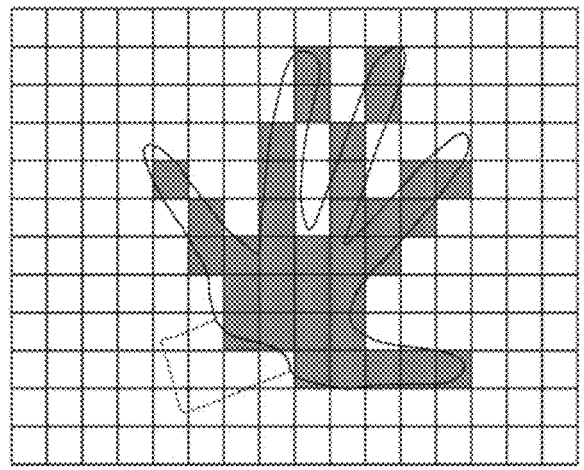
FIGS. 6A and 6B are diagrams showing the entire specific example of enlargement of an imaging region in region control imaging in the first embodiment of the present technology.
Figure 6B:
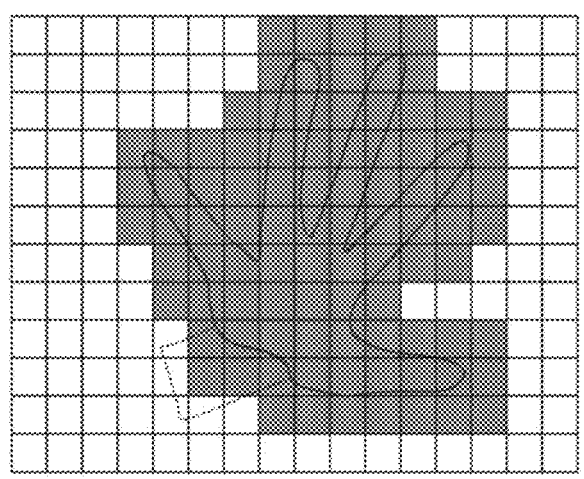

FIGS. 6A and 6B are diagrams showing the entire specific example of enlargement of an imaging region in region control imaging in the first embodiment of the present technology.

As indicated by FIG. 6A, in a case where the pixel block 621 is determined on the basis of the gradation of the central pixel, part of the hand may not be imaged in the region control imaging if it remains as it is.

On the other hand, as indicated by FIG. 6B, since the coordinates are set to be extended to the pixel block in the periphery of the pixel block determined by the gradation, it is possible to perform region control imaging of the entire hand.

[Motion]

Figure 7:
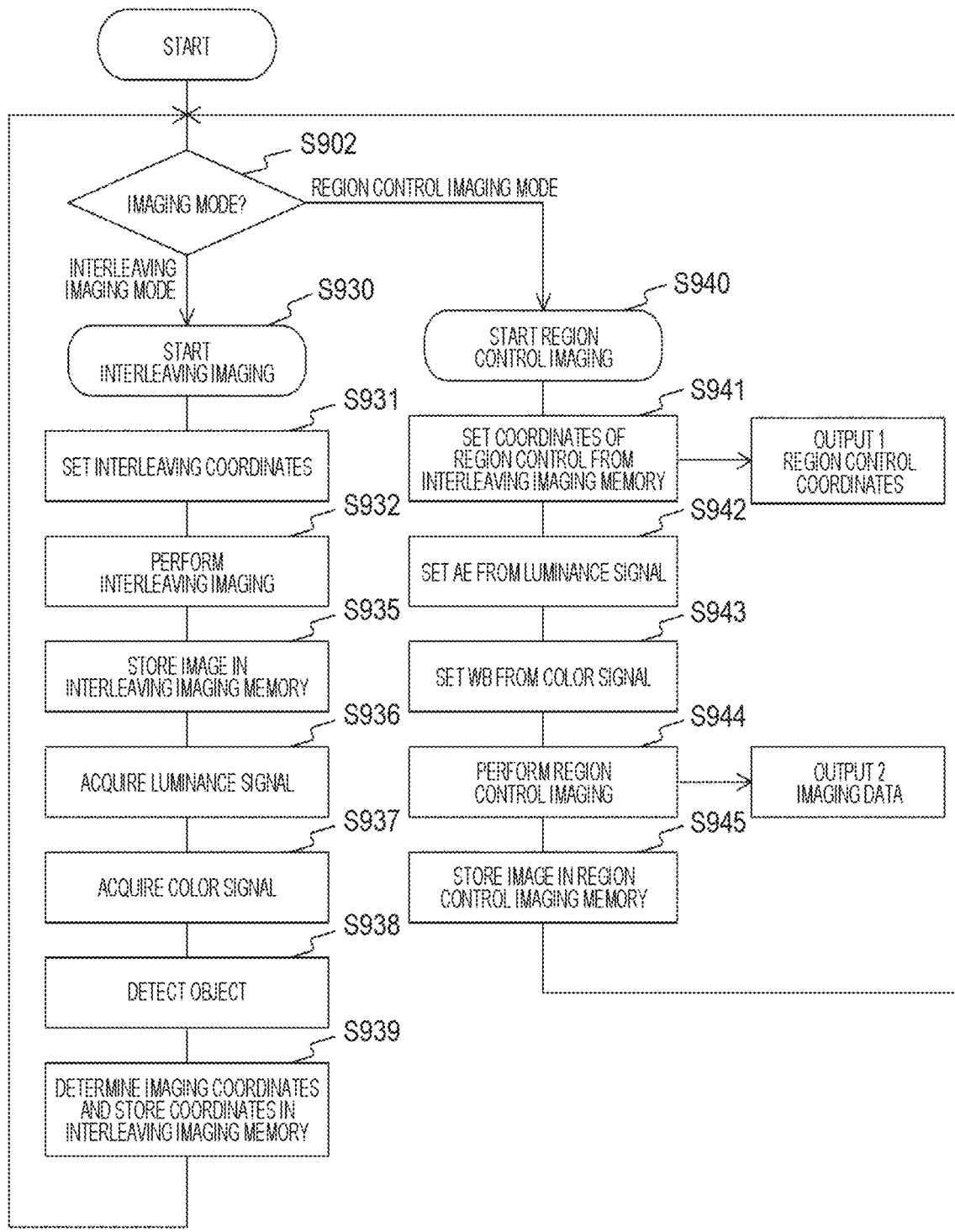
FIG. 7 is a flowchart showing an example of a processing step of interleaving imaging and region control imaging in the first embodiment of the present technology.

FIG. 7 is a flowchart showing an example of a processing step of interleaving imaging and region control imaging in the first embodiment of the present technology.

In the first embodiment, interleaving imaging and region control imaging are alternately performed. First, imaging is performed in the interleaving imaging mode (step S902: interleaving imaging mode) (step S930). In each of the pixel blocks, for example, the central pixel is set as the interleaving coordinates (step S931).

Then, at the set coordinates, interleaving imaging is performed at, for example, 1000 fps (step S932). The image captured by the interleaving imaging is stored in the interleaving imaging memory 141 (step S935).

Then, the luminance signal and the color signal are extracted from the interleaving imaging memory 141 (steps S936 and S937), and the object detection is performed (step S938). That is, as described above, the coordinates are determined according to the gradation of the luminance signal by using the difference from the reference value, and the coordinates are set in the interleaving imaging memory 141 (step S939).

Next, imaging is performed in the region control imaging mode (step S902: region control imaging mode) (step S940). In this region control imaging mode, region control coordinates are set from the interleaving imaging memory 141 (step S941). Then, the luminance signal is read from the interleaving imaging memory 141, the AE control is performed using the luminance signal, and the shutter speed and the gain are set (step S942). Furthermore, a color signal is read from the interleaving imaging memory 141, and the white balance is determined from the color signal (step S943).

Then, at the set coordinates, the region control imaging is performed at, for example, 1000 fps (step S944). The image captured by the region control imaging is stored in the region control imaging memory 142 (step S945).

As described above, according to the first embodiment of the present technology, in the pixel ADC type imaging apparatus, it is possible to perform region control imaging on the basis of the result of interleaving imaging. That is, it is possible to set the coordinates for performing the region control imaging on the basis of the luminance signal obtained in the interleaving imaging.

Furthermore, in this embodiment, the signal used for object detection can be used for AE control. That is, normally, the AE control is performed by the whole interleaved luminance signal, but in the first embodiment, since the pixel ADC type is assumed, the AE control can be performed for each pixel by the luminance signal obtained by the interleaving imaging. For example, in a scene in which the sun and the shade coexist, the region control imaging can be performed by performing the AE control with the region of the sun as a reference, and by performing the AE control with the region of the shade as a reference. Therefore, it is possible to appropriately perform AE control in each of the bright portion and the dark portion to capture an image.

2. Second Embodiment

Although the pixel ADC type is assumed in the above-described first embodiment, the area ADC type is assumed in this second embodiment. Note that, since the overall configuration of the imaging apparatus 100 is similar to that of the above-described first embodiment, detailed description thereof will be omitted.

[Interleaving Imaging and Region Control Imaging]

FIGS. 8A, 8B, and 8C are diagrams showing a specific example of interleaving imaging and region control imaging in the second embodiment of the present technology.

In this example, it is assumed that a scene of a finger 601 is imaged, as indicated by FIG. 8A.

First, in the interleaving imaging mode, as shown in FIG. 8B, as an example, in a pixel block 611 of eight pixels×eight pixels, the coordinates 612 are set so that an approximately center thereof is imaged as a representative pixel. In this way, one image is interleaved for every 64 pixels.

Since the area ADC type is assumed in the second embodiment, any pixel in the pixel block 611 of eight pixels×eight pixels may be imaged. For example, if pixels are set randomly among eight pixels×eight pixels, the pixels can be used for compressive sensing. In the vertical direction, coordinates are set for each area, and also in the horizontal direction, coordinates are set for each area.

After setting the coordinates, imaging is performed at, for example, 1000 fps. Then, the captured image is stored in the interleaving imaging memory 141.

Then, the luminance signal is extracted from the interleaving imaging memory 141, and the coordinates are set according to the gradation of the luminance signal. Therefore, the region of the finger 601 is imaged in the region control imaging mode, as indicated by FIG. 8C. Note that the imaging region may be extended to a periphery pixel block, as similar to the first embodiment described above.

Figure 9A:
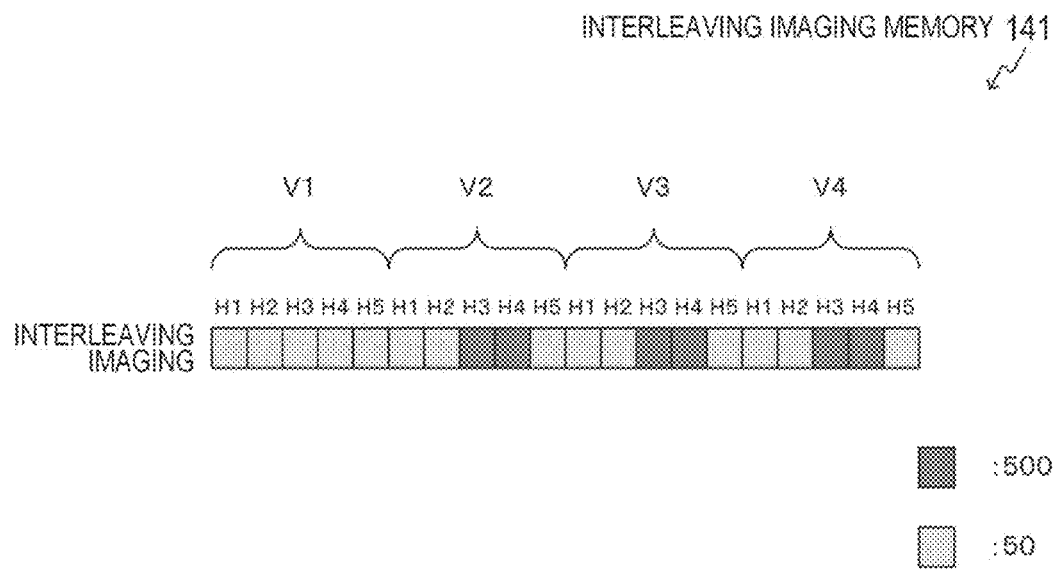
FIGS. 9A and 9B are diagrams showing a specific example of the interleaving imaging and determination in the second embodiment of the present technology.
Figure 9B:
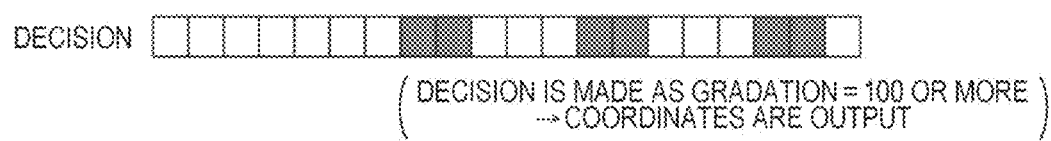

FIGS. 9A and 9B are diagrams showing a specific example of the interleaving imaging and determination in the second embodiment of the present technology.

By the interleaving imaging, a luminance signal is obtained in the interleaving imaging memory 141 as indicated by FIG. 9A. In this example, only the substantially center of eight pixels×eight pixels is subjected to interleaving imaging as a representative pixel and the image is stored with the luminance signal. As described above, it is assumed that a signal of "50" gradation is obtained in a dark scene and a signal of "500" gradation is obtained in a bright place. Then, as indicated by FIG. 9B, the coordinates of "100" gradation or higher are determined and the coordinates are set.

Note that the overall processing step is similar to that of the first embodiment described above, and thus detailed description thereof is omitted.

As described above, according to the second embodiment of the present technology, in the area ADC type imaging apparatus, it is possible to perform region control imaging on the basis of the result of interleaving imaging.

3. Third Embodiment

Although the pixel ADC type is assumed in the above-described first embodiment, the column ADC type is assumed in this third embodiment. Note that, since the overall configuration of the imaging apparatus 100 is similar to that of the above-described first embodiment, detailed description thereof will be omitted.

[Interleaving Imaging and Region Control Imaging]

Figures 10A, 10B:
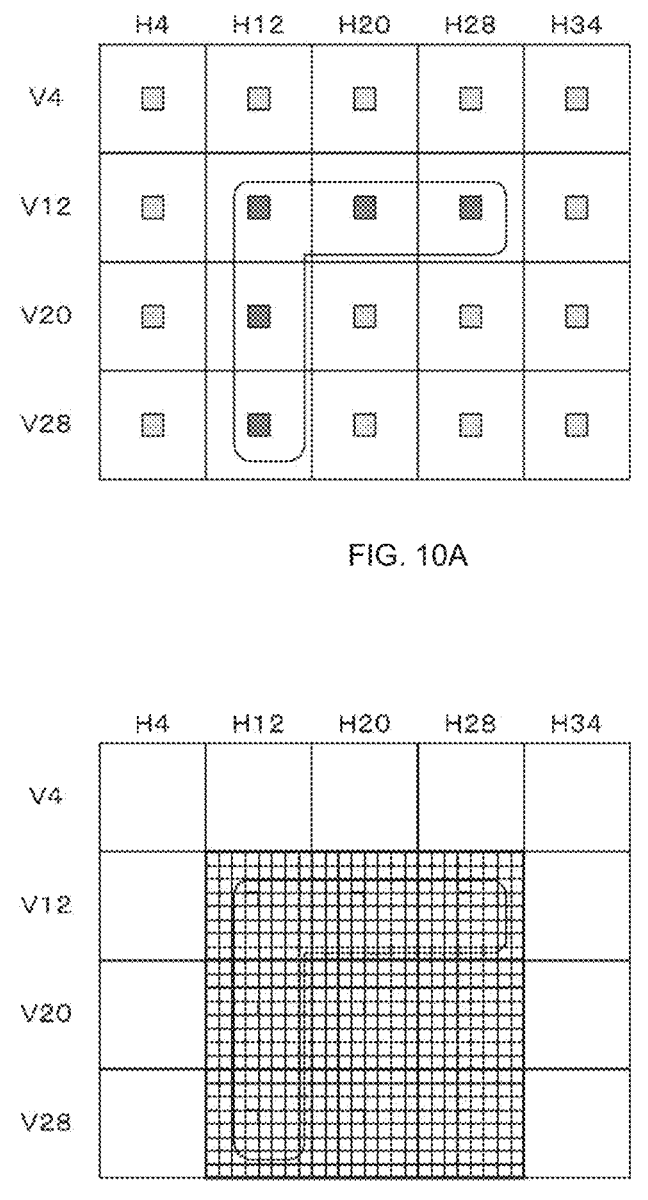

FIGS. 10A and 10B are diagrams showing a specific example of interleaving imaging and region control imaging in the third embodiment of the present technology.

In this example, it is assumed that a boomerang-shaped object is imaged, as indicated by FIG. 10A.

In the interleaving imaging, for example, the coordinates are set so as to perform imaging every eight lines in the vertical direction. Furthermore, the coordinates are set so that imaging is performed every eight lines in the horizontal direction. As described above, interleaving imaging is performed for one representative pixel in 64 pixels.

Therefore, the entire region including the boomerang-shaped object can be captured by the region control imaging as indicated by FIG. 10B.

FIGS. 11A and 11B, 11C, and 11D are diagrams showing a specific example of the interleaving imaging and determination in the third embodiment of the present technology.

Figure 11A:
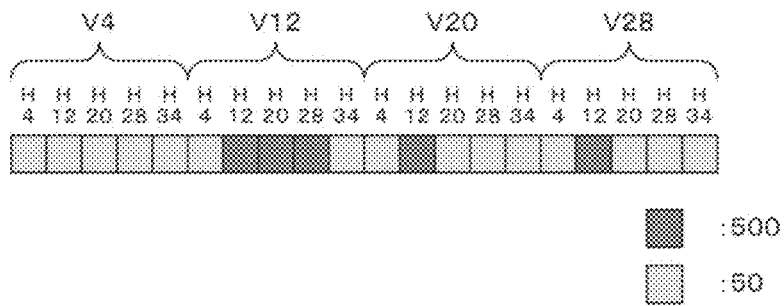
FIGS. 11A and 11B, 11C, and 11D are diagrams showing a specific example of the interleaving imaging and determination in the third embodiment of the present technology.

By the interleaving imaging, a luminance signal is obtained in the interleaving imaging memory 141 as indicated by FIG. 11A.

Figure 11B:
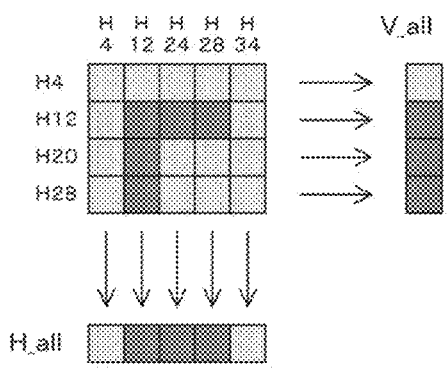

Since a column ADC type is assumed in the third embodiment, predetermined decided values H_all and V_all are detected in the vertical direction and the horizontal direction, as indicated by FIG. 11B. This decided value is a statistical value such as a maximum value or a minimum value.

Figure 11C:
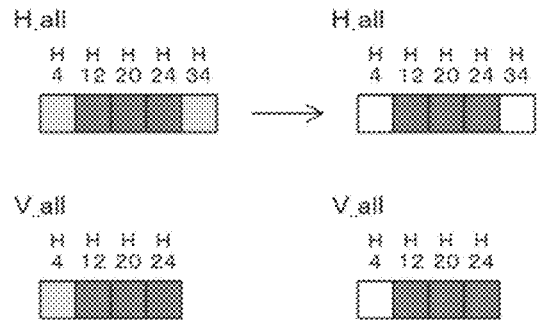

Then, for the decided values H_all and V_all, as indicated by FIG. 11C, for example, the coordinate of "100" gradation or higher is decided and the coordinate is set.

Figure 11D:
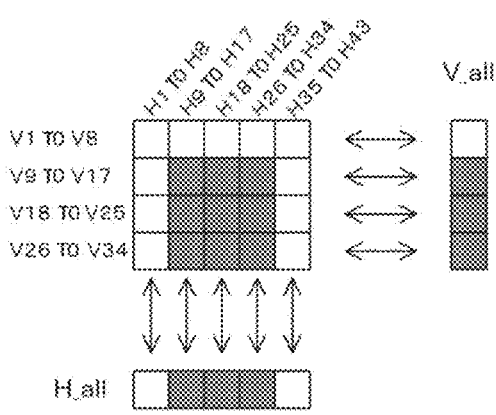

That is, as indicated by FIG. 11D, the coordinates in the vertical direction and the horizontal direction are set according to the decision result, and the region control imaging is performed.

[Motion]

Figure 12:
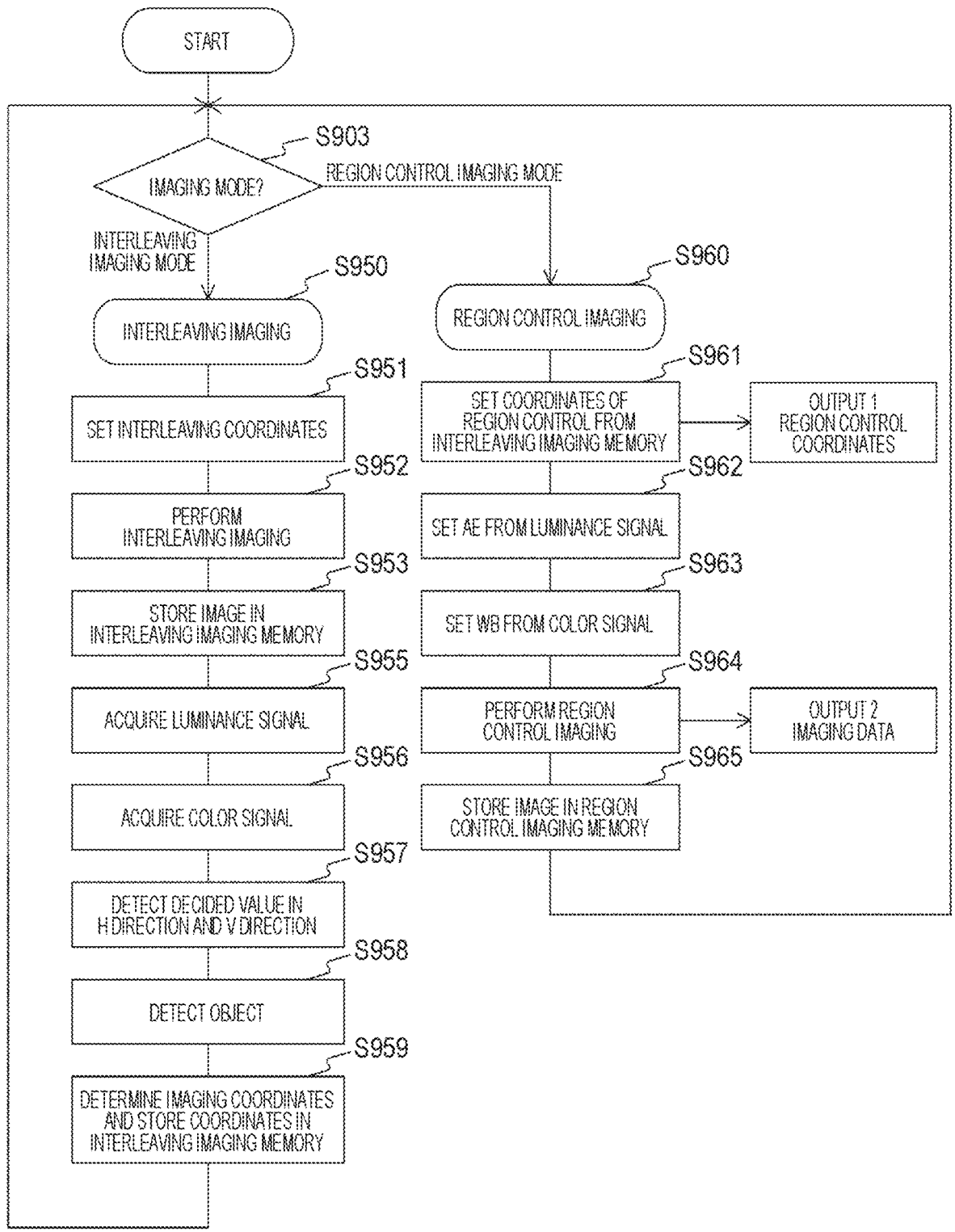
FIG. 12 is a flowchart showing an example of a processing step of interleaving imaging and region control imaging in the third embodiment of the present technology.

FIG. 12 is a flowchart showing an example of a processing step of interleaving imaging and region control imaging in the third embodiment of the present technology.

In the third embodiment, interleaving imaging and region control imaging are alternately performed. First, imaging is performed in the interleaving imaging mode (step S903: interleaving imaging mode) (step S950). In each of the pixel blocks, one pixel is set as the interleaving coordinates (step S951).

Then, at the set coordinates, interleaving imaging is performed at, for example, 1000 fps (step S952). The image captured by the interleaving imaging is stored in the interleaving imaging memory 141 (step S953).

Then, the luminance signal and the color signal are extracted from the interleaving imaging memory 141 (steps S955 and S956), and the decided value (for example, the maximum value or the minimum value) is detected in the vertical direction and the horizontal direction (step S957). Then, object detection is performed using these decided values (step S958). That is, as described above, the coordinates are determined according to the gradation of the luminance signal by using the decided value, and the coordinates are set in the interleaving imaging memory 141 (step S959).

Next, imaging is performed in the region control imaging mode (step S903: region control imaging mode) (step S960). In this region control imaging mode, region control coordinates are set from the interleaving imaging memory 141 (step S961). Then, the luminance signal is read from the interleaving imaging memory 141, the AE control is performed using the luminance signal, and the shutter speed and the gain are set (step S962). Furthermore, a color signal is read from the interleaving imaging memory 141, and the white balance is determined from the color signal (step S963).

Then, at the set coordinates, the region control imaging is performed at, for example, 1000 fps (step S964). The image captured by the region control imaging is stored in the region control imaging memory 142 (step S965).

As described above, according to the third embodiment of the present technology, in the column ADC type imaging apparatus, it is possible to perform region control imaging on the basis of the result of interleaving imaging.

4. Fourth Embodiment

In the above-described first to third embodiments, an example in which object detection is performed under the same conditions for each frame has been described, but by positively utilizing the nature of moving image frames, a more accurate object detection can be performed. Note that, since the overall configuration of the imaging apparatus 100 is similar to that of the above-described first embodiment, detailed description thereof will be omitted.

[Interleaving Imaging and Region Control Imaging]

Figure 13:
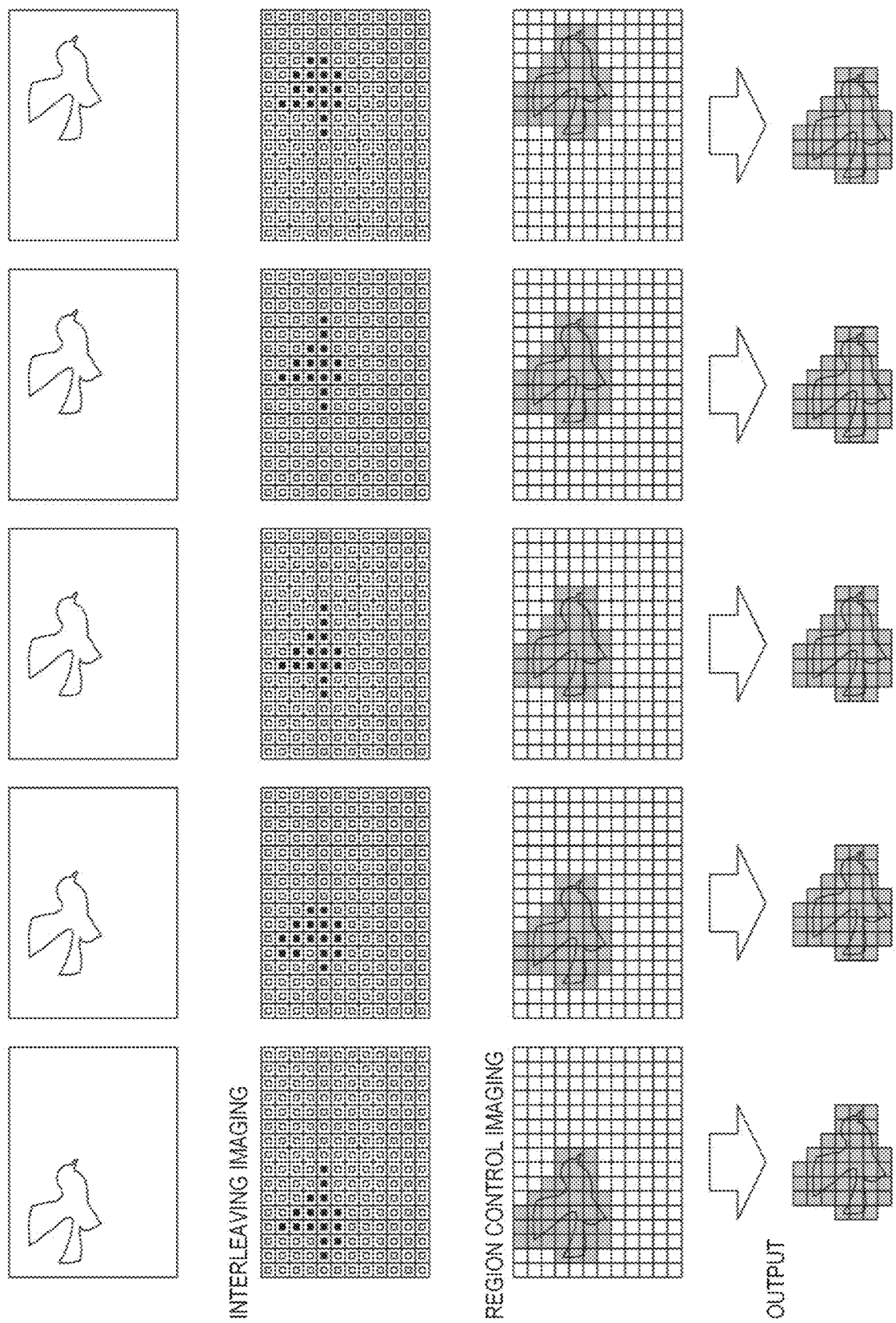
FIG. 13 is a diagram showing a specific example of interleaving imaging and region control imaging in a fourth embodiment of the present technology.

FIG. 13 is a diagram showing a specific example of interleaving imaging and region control imaging in a fourth embodiment of the present technology. In this example, a scene where a bird flies in the sky is assumed.

First, in the interleaving imaging mode, imaging is performed at, for example, 1000 fps. In this interleaving imaging mode, imaging is performed by shortening the shutter time due to short storage. The imaging coordinates are set to desired coordinates according to the ADC type, depending on whether the ADC type is the above-mentioned pixel ADC type, area ADC type, or column ADC type.

Furthermore, in this interleaving imaging mode, the first frame is set uniformly in AE control and WB control. Then, for the second and subsequent frames, AE control and WB control are performed on the basis of the luminance value and the color signal of the previous frame for each coordinate.

Next, in the region control imaging, imaging is performed at a long storage and region control, for example, at 1000 fps. The region control coordinates are read from the interleaving imaging memory 141, and the region control imaging is performed in accordance with the coordinates. AE control is performed with the luminance signal of interleaving imaging, and WB control is performed on the basis of the color signal of interleaving imaging.

[Background and Object]

In order to detect an object in a moving image frame, a background reference value is assumed, and whether or not the difference from the reference value is a predetermined threshold or more is decided. Here, the reference value may be set as a fixed value in advance, or, when there is no change for certain frames (for example, 100 frames), the luminance signal in the frames may be set as the reference value.

If the reference value and the luminance value of the object are known, it is possible to decide a pixel whose luminance signal is the luminance value of the object in the interleaving imaging as an object. Furthermore, even if the luminance value of the object is not known in advance, if the difference between the luminance signal and the reference value in the interleaving imaging is a predetermined threshold or more, it can be decided as an object. Such a relationship between the background and the object is common to other embodiments.

As described above, according to the fourth embodiment of the present technology, it is possible to perform highly accurate object detection on a moving image frame and perform region control imaging according to the detected object.

5. Fifth Embodiment

In the above-described fourth embodiment, it is assumed that the interleaving imaging and the region control imaging are performed at the same frame rate. On the other hand, it is possible to improve the accuracy of object detection by lowering the frame rate of the region control imaging than the frame rate of the interleaving imaging. In a fifth embodiment, an example will be described in which the coordinates of an object are estimated on the basis of the result of interleaving imaging, and the region control imaging is performed for the estimated coordinates. Note that, since the overall configuration of the imaging apparatus 100 is similar to that of the above-described first embodiment, detailed description thereof will be omitted.

[Interleaving Imaging and Region Control Imaging]

Figure 14:
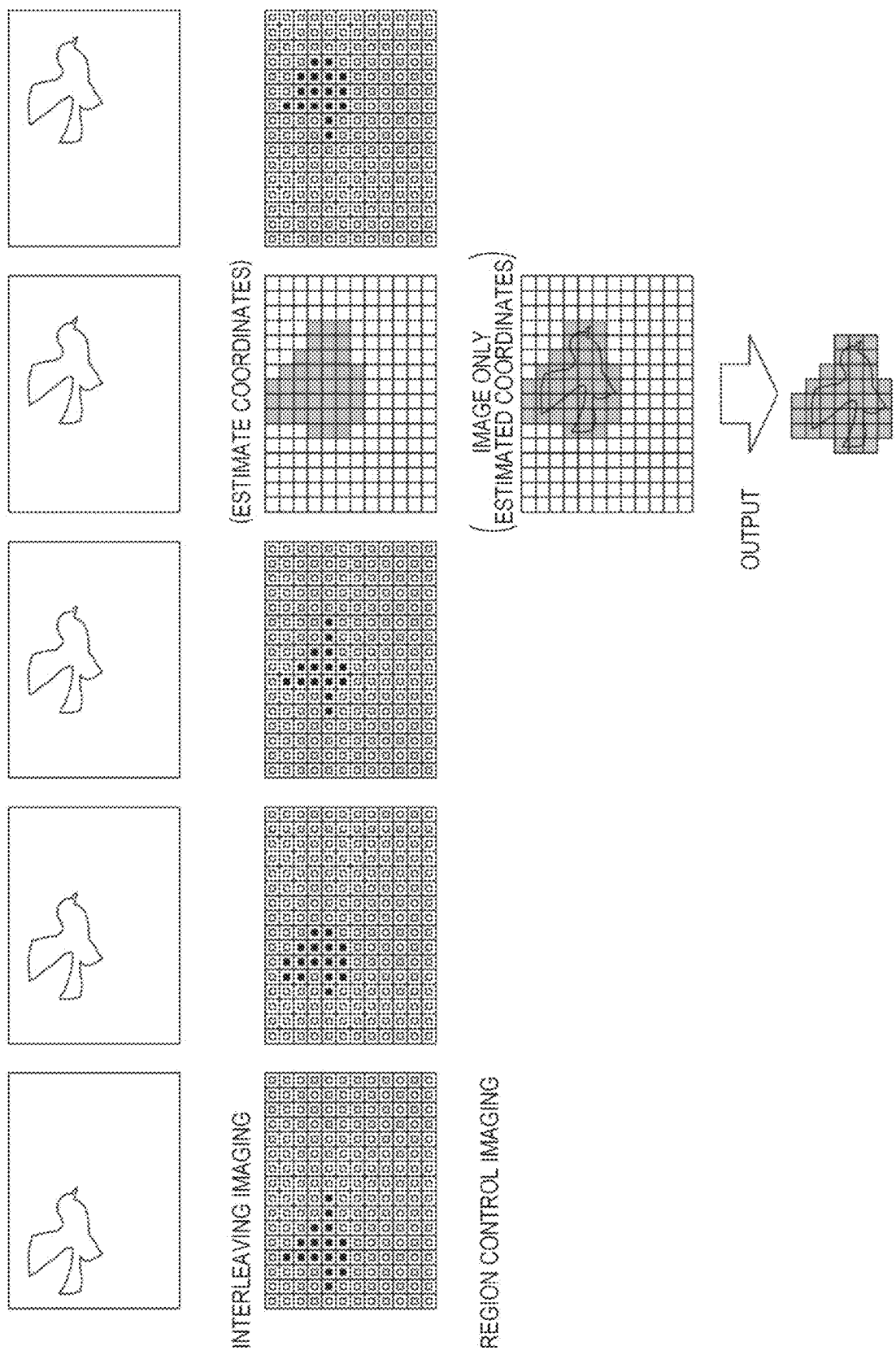
FIG. 14 is a diagram showing a specific example of interleaving imaging and region control imaging in a fifth embodiment of the present technology.

FIG. 14 is a diagram showing a specific example of interleaving imaging and region control imaging in the fifth embodiment of the present technology. In this example, a scene where a bird flies in the sky is assumed.

First, in the interleaving imaging mode, imaging is performed at, for example, 240 fps. The imaging coordinates are set to desired coordinates according to the ADC type, depending on whether the ADC type is the above-mentioned pixel ADC type, area ADC type, or column ADC type.

In this example, the interleaving imaging for three frames is performed, the difference from the reference value and a threshold are compared at each coordinate, and the results are stored at different addresses in the interleaving imaging memory 141, respectively. The relationship between a background and an object is similar to that in the above-described fourth embodiment.

At this time, in this interleaving imaging mode, the first frame is set uniformly in AE control and WB control. Then, for the second and subsequent frames, AE control and WB control are performed on the basis of the luminance value and the color signal of the previous frame for each coordinate.

Then, the coordinates of the fourth frame are estimated from the values of the past three frames stored in the interleaving imaging memory 141. Furthermore, also for the luminance value, the luminance value of the fourth frame is estimated from the values stored in the interleaving imaging memory 141 for the past three frames. The coordinates and the luminance value of the fourth frame are stored in the interleaving imaging memory 141. However, in this example, the interleaving imaging of the fourth frame is not performed.

Next, in the region control imaging, imaging is performed at, for example, 60 fps. That is, in the interleaving imaging mode, at the timing of the fourth frame after the interleaving imaging of three frames, the region control imaging is performed without performing the interleaving imaging. At this time, the region control coordinates are read from the interleaving imaging memory 141, and the region control imaging is performed in accordance with the coordinates. AE control is performed with the luminance signal of interleaving imaging, and WB control is performed on the basis of the color signal of interleaving imaging.

Note that, in this example, it is assumed that the interleaving imaging of the fourth frame is not performed, but as another example, the interleaving imaging of the fourth frame may be performed and the region control imaging of the timing of the fourth frame is performed using the coordinates of four frames. At that time, the coordinates of the region control imaging at the timing of the fourth frame may be obtained by the average or logical sum (OR) of the coordinates of four frames.

[Motion]

Figure 15:
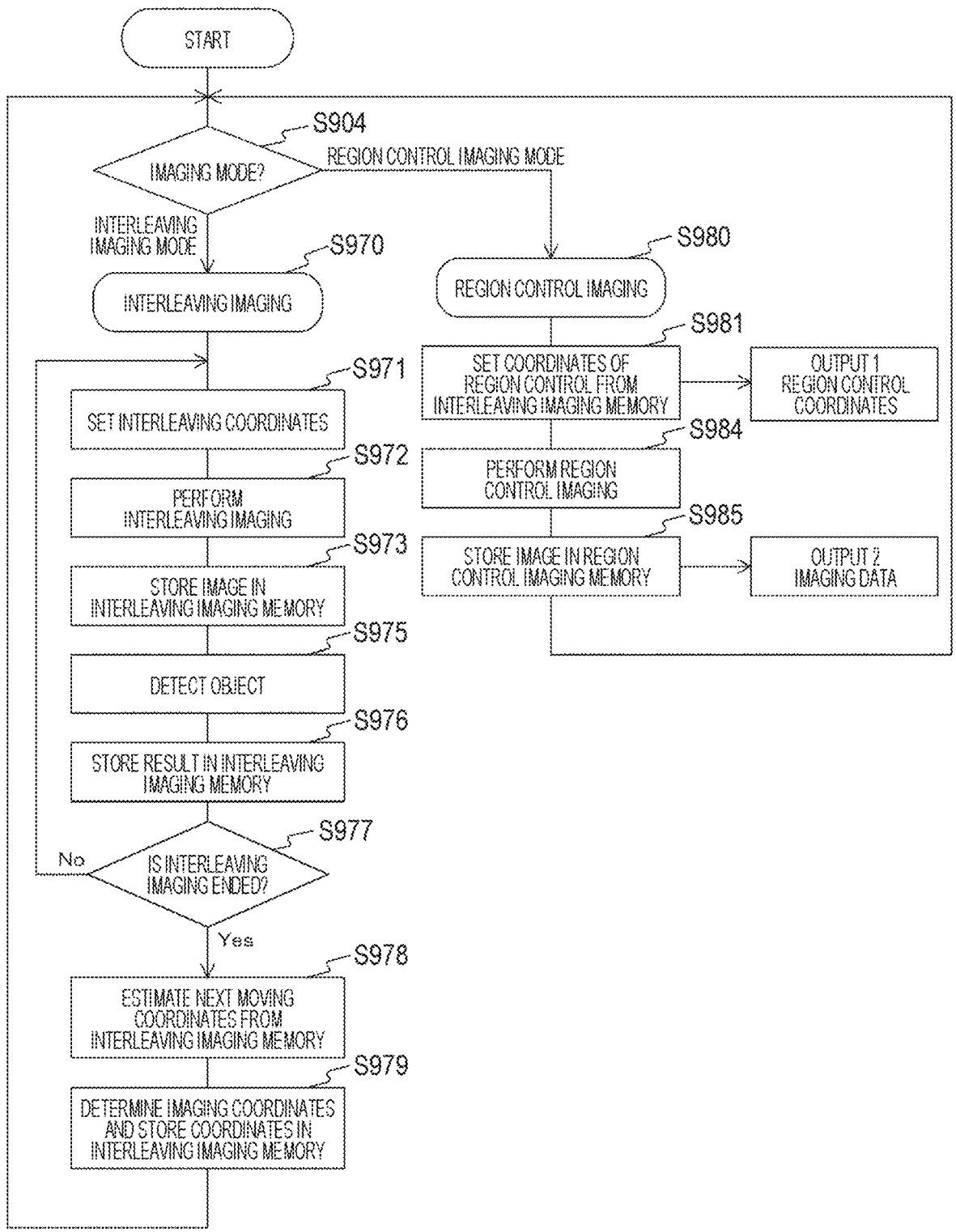
FIG. 15 is a flowchart showing an example of a processing procedure of interleaving imaging and region control imaging by an area ADC type and a pixel ADC type in the fifth embodiment of the present technology.

FIG. 15 is a flowchart showing an example of a processing procedure of interleaving imaging and region control imaging by an area ADC type and a pixel ADC type in the fifth embodiment of the present technology.

In the fifth embodiment, as described above, the interleaving imaging for three frames and region control imaging for one frame are sequentially performed. First, imaging is performed in the interleaving imaging mode (step S904: interleaving imaging mode) (step S970). In each of the pixel blocks, one pixel is set as the interleaving coordinates (step S971).

Then, at the set coordinates, interleaving imaging is performed at, for example, 240 fps (step S972). The image captured by the interleaving imaging is stored in the interleaving imaging memory 141 (step S973). Then, object detection is performed (step S975), and the result is stored in the interleaving imaging memory 141 (step S976).

Thereafter, the interleaving imaging for three frames is repeated (step S977: No). When the interleaving imaging for three frames is performed (step S977: Yes), the moving coordinates in the next frame are estimated from the result of interleaving imaging for three frames (step S978), and the estimated coordinates are stored in the interleaving imaging memory 141 (step S979).

When the interleaving imaging for three frames is completed, imaging is performed in the region control imaging mode (step S904: region control imaging mode) (step S980). In this region control imaging mode, the coordinates of region control are set from the interleaving imaging memory 141 (step S981), and the region control imaging is performed at 60 fps, for example, according to the coordinates (step S984). The image captured by the region control imaging is stored in the region control imaging memory 142 (step S985).

Figure 16:
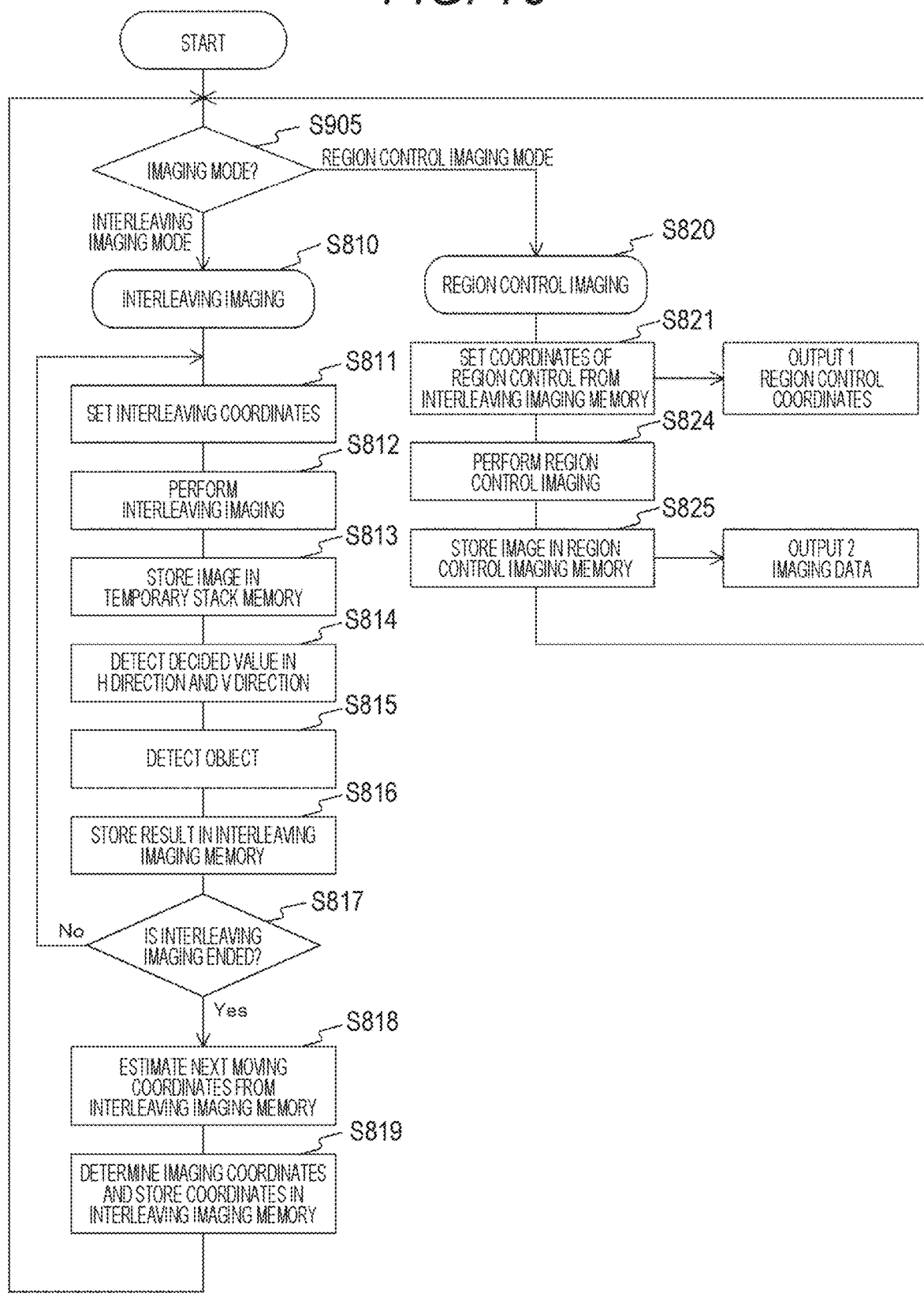
FIG. 16 is a flowchart showing an example of a processing procedure of interleaving imaging and region control imaging by a column ADC type in the fifth embodiment of the present technology.

FIG. 16 is a flowchart showing an example of a processing procedure of interleaving imaging and region control imaging by a column ADC type in the fifth embodiment of the present technology.

In the fifth embodiment, as described above, the interleaving imaging for three frames and region control imaging for one frame are sequentially performed also for the column ADC type. First, imaging is performed in the interleaving imaging mode (step S905: interleaving imaging mode) (step S810). In each of the pixel blocks, one pixel is set as the interleaving coordinates (step S811).

Then, at the set coordinates, interleaving imaging is performed at, for example, 240 fps (step S812). The images captured by the interleaving imaging are held in a temporary stack memory (step S813).

Then, the decided value (for example, the maximum value or the minimum value) is detected in the vertical direction and the horizontal direction (step S814), and the object detection is performed using these decided values (step S815). That is, as described above, the coordinates are determined according to the gradation of the luminance signal by using the decided value, and the coordinates are set in the interleaving imaging memory 141 (step S816).

Thereafter, the interleaving imaging for three frames is repeated (step S817: No). When the interleaving imaging for three frames is performed (step S817: Yes), the moving coordinates in the next frame are estimated from the result of interleaving imaging for three frames (step S818), and the estimated coordinates are stored in the interleaving imaging memory 141 (step S819).

When the interleaving imaging for three frames is completed, imaging is performed in the region control imaging mode (step S905: region control imaging mode) (step S820). In this region control imaging mode, the coordinates of region control are set from the interleaving imaging memory 141 (step S821), and the region control imaging is performed at 60 fps, for example, according to the coordinates (step S824). The image captured by the region control imaging is stored in the region control imaging memory 142 (step S825).

As described above, according to the fifth embodiment of the present technology, it is possible to perform highly accurate coordinate estimation on a moving image frame and perform region control imaging according to the detected object. Furthermore, this makes it possible to acquire tracking coordinates tracking a moving object.

6. Sixth Embodiment

In each of the above-described embodiments, normal destructive reading is assumed for the reading of signals in the solid-state imaging unit 120. On the other hand, in the sixth embodiment, an example of performing nondestructive reading in the solid-state imaging unit 120 will be described. Note that, since the overall configuration of the imaging apparatus 100 is similar to that of the above-described first embodiment, detailed description thereof will be omitted.

The nondestructive reading method is a method in which, when charges (pixel signals) are read from a photoelectric conversion element, the charges accumulated in the photoelectric conversion element are not emptied but are kept in the accumulated state. That is, since reset processing is not performed at the time of reading charges, it is possible to repeatedly read charges at the time of exposure with different exposure times during the accumulation of charges until the set exposure time is reached. Therefore, the nondestructive reading method has an advantage that multi-step exposure can be easily realized.

[Interleaving Imaging and Region Control Imaging]

Figure 17:
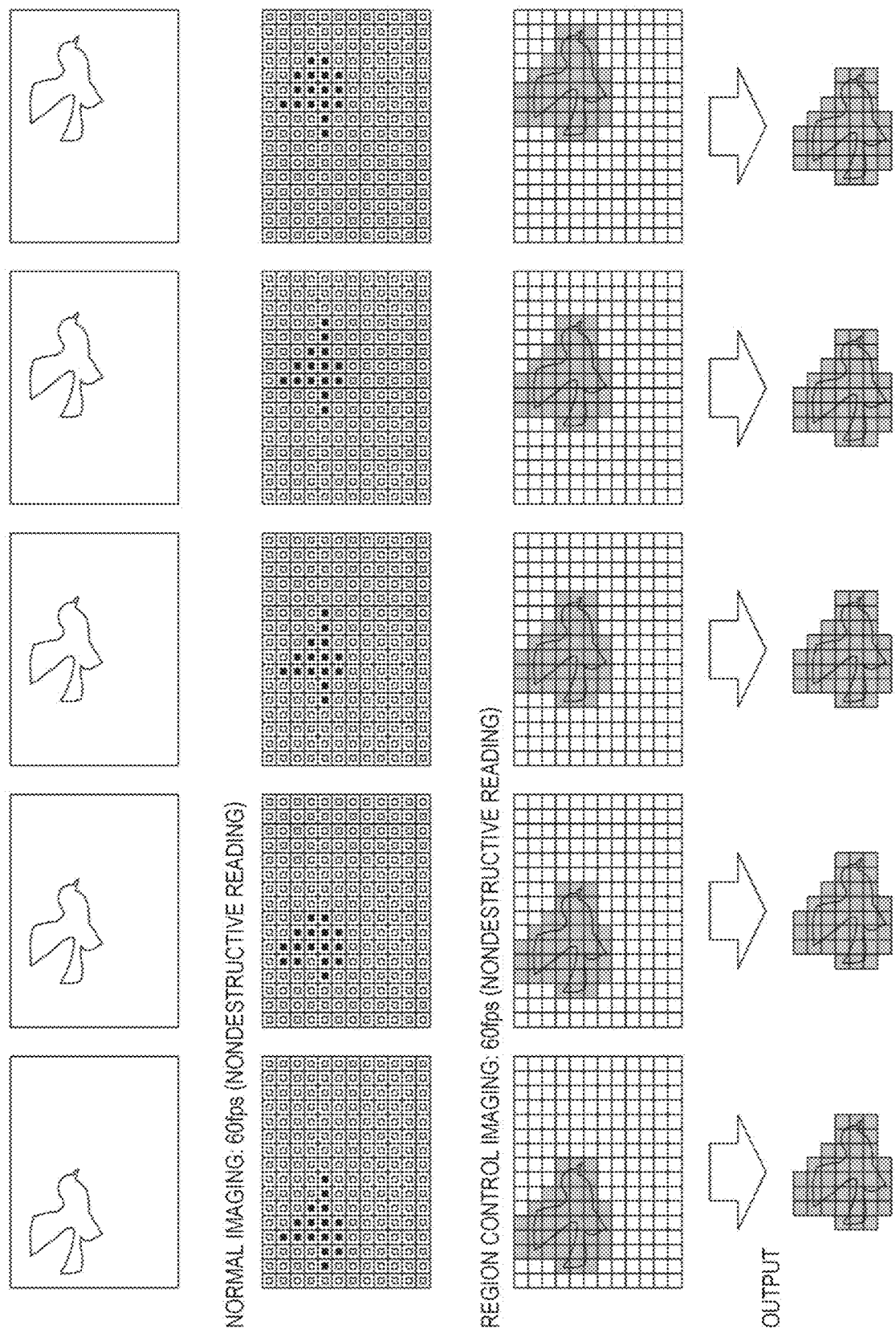
FIG. 17 is a diagram showing a specific example of interleaving imaging and region control imaging in a sixth embodiment of the present technology.

FIG. 17 is a diagram showing a specific example of interleaving imaging and region control imaging in the sixth embodiment of the present technology. In this example, a scene where a bird flies in the sky is assumed.

First, in the interleaving imaging mode, imaging is performed at, for example, 60 fps by the nondestructive reading method. The imaging coordinates are set to desired coordinates according to the ADC type, depending on whether the ADC type is the above-mentioned pixel ADC type, area ADC type, or column ADC type.

Next, in the region control imaging, imaging is performed at, for example, 60 fps by the nondestructive reading method. At this time, the region control coordinates are read from the interleaving imaging memory 141, and the region control imaging is performed in accordance with the coordinates. AE control is performed with the luminance signal of interleaving imaging, and WB control is performed on the basis of the color signal of interleaving imaging.

[Motion]

Figure 18:
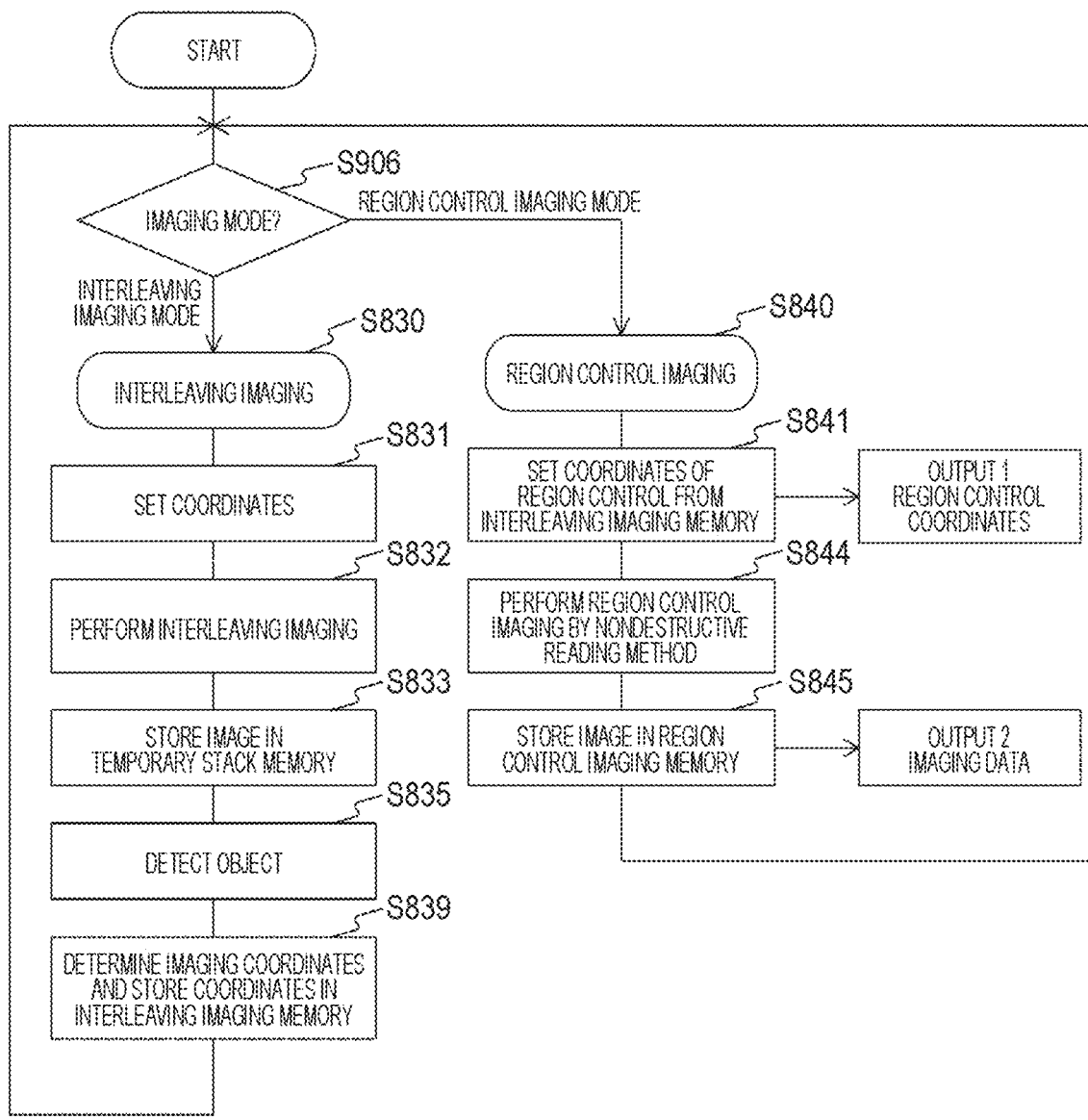
FIG. 18 is a flowchart showing an example of a processing procedure of interleaving imaging and region control imaging by an area ADC type and a pixel ADC type in the sixth embodiment of the present technology.

FIG. 18 is a flowchart showing an example of a processing procedure of interleaving imaging and region control imaging by an area ADC type and a pixel ADC type in the sixth embodiment of the present technology.

In the sixth embodiment, interleaving imaging and region control imaging are alternately performed. First, imaging is performed in the interleaving imaging mode (step S906: interleaving imaging mode) (step S830). In each of the pixel blocks, one pixel is set as the interleaving coordinates (step S831).

Then, at the set coordinates, interleaving imaging is performed at, for example, 60 fps (step S832). The images captured by the interleaving imaging are stored in a temporary stack memory (step S833). Then, object detection is performed (step S835), and the result is stored in the interleaving imaging memory 141 (step S839).

Next, imaging is performed in the region control imaging mode (step S906: region control imaging mode) (step S840). In this region control imaging mode, the coordinates of region control are set from the interleaving imaging memory 141 (step S841), and the region control imaging is performed at 60 fps, for example, according to the coordinates (step S844). The image captured by the region control imaging is stored in the region control imaging memory 142 (step S845).

Figure 19:
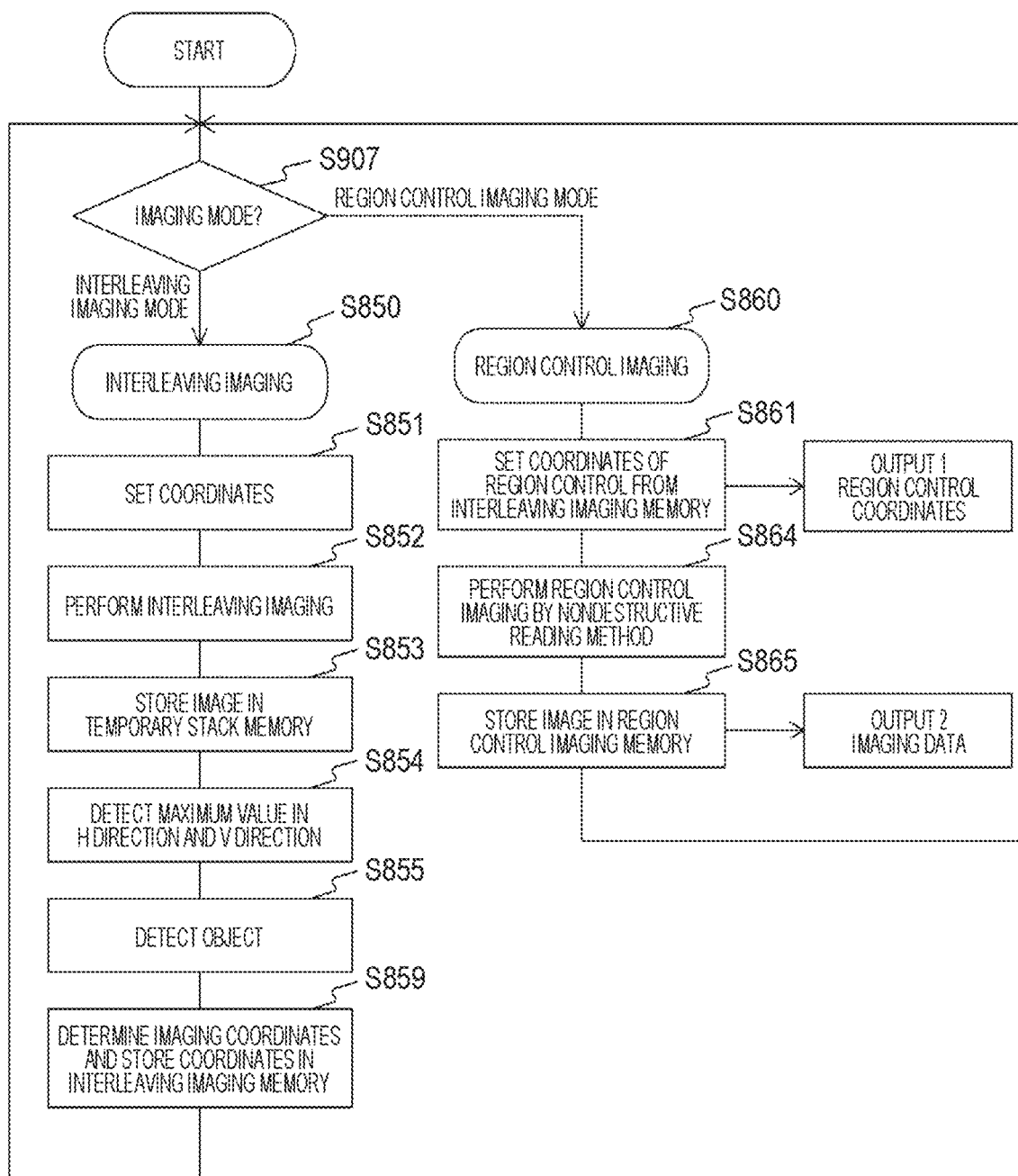
FIG. 19 is a flowchart showing an example of a processing procedure of interleaving imaging and region control imaging by a column ADC type in the sixth embodiment of the present technology.

FIG. 19 is a flowchart showing an example of a processing procedure of interleaving imaging and region control imaging by a column ADC type in the sixth embodiment of the present technology.

In the sixth embodiment, interleaving imaging and region control imaging are alternately performed also for the column ADC type as described above. First, imaging is performed in the interleaving imaging mode (step S907: interleaving imaging mode) (step S850). In each of the pixel blocks, one pixel is set as the interleaving coordinates (step S851).

Then, at the set coordinates, interleaving imaging is performed at, for example, 60 fps (step S852). The images captured by the interleaving imaging are held in a temporary stack memory (step S853)

Then, the decided value (for example, the maximum value or the minimum value) is detected in the vertical direction and the horizontal direction (step S854), and the object detection is performed using these decided values (step S855). That is, as described above, the coordinates are determined according to the gradation of the luminance signal by using the decided value, and the coordinates are set in the interleaving imaging memory 141 (step S859).

Next, imaging is performed in the region control imaging mode (step S907: region control imaging mode) (step S860). In this region control imaging mode, the coordinates of region control are set from the interleaving imaging memory 141 (step S861), and the region control imaging is performed at 60 fps, for example, according to the coordinates (step S864). The image captured by the region control imaging is stored in the region control imaging memory 142 (step S865).

As described above, according to the sixth embodiment of the present technology, it is possible to realize multi-step exposure by performing nondestructive reading in the solid-state imaging unit 120. That is, a wide dynamic range and omission of driving can be realized, and power consumption can be reduced.

7. Application Example

The above-described embodiments of the present technology can be applied to various technologies as exemplified below.

FIG. 20 is a diagram showing an example of a field to which an embodiment of the present technology is applied.

The imaging apparatus according to an embodiment of the present technology can be used as an apparatus that captures an image used for viewing, such as a digital camera or a mobile device with a camera function, for example.

Furthermore, this imaging apparatus can be used as an apparatus used for traffic purpose such as: an in-vehicle sensor for photographing the surroundings, inside of a car, or the like of an automobile for safe driving such as automatic stop and recognition of driver's condition or the like; a surveillance camera for monitoring traveling vehicles and roads; and a distance measuring sensor that measures the distance between vehicles or the like.

Furthermore, this imaging apparatus can be used as an apparatus used for a home electrical appliance such as TV, refrigerator, and air conditioner, to photograph user's gesture and perform equipment operation according to the gesture.

Furthermore, this imaging apparatus can be used as an apparatus used for medical and health care, such as an endoscope, or a device for performing angiography by receiving infrared light.

Furthermore, this imaging apparatus can be used as an apparatus used for security such as a surveillance camera, and a camera for person authentication.

Furthermore, this imaging apparatus can be used as an apparatus used for beauty care such as a skin measuring instrument for photographing skin, and a microscope for photographing the scalp.

Furthermore, this imaging apparatus can be used as an apparatus used for sport such as an action camera or a wearable camera for sports applications or the like.

Furthermore, this imaging apparatus can be used as an apparatus used for agriculture such as a camera for monitoring the condition of fields and crops.

Note that the above-described embodiment shows an example for embodying the present technology, and matters in the embodiment and invention specifying matters in the claims have correspondence relationships with each other. As similar to this, the invention specifying matter in the claims and the matters in the embodiment of the present technology with the same name have correspondence relationships with each other. However, the present technology is not limited to the embodiment, but can be embodied by subjecting the embodiment to various modifications without departing from the gist thereof.

Furthermore, the processing procedure described in the above-described embodiment may be regarded as a method having these series of procedures. Furthermore, the processing procedure may be regarded as a program for causing a computer to execute these series of procedures or a recording medium for storing the program. As this recording medium, for example, a compact disc (CD), a MiniDisc (MD), a digital versatile disc (DVD), a memory card, a Blu-ray (registered trademark) Disc, or the like can be used.

Note that, the effects described in the present specification are merely examples and are not intended to be limiting, and other effects may be provided.

Note that, the present technology can also adopt the following configuration.

(1) An imaging apparatus including:

an imaging element that generates, for a plurality of pixel blocks each including a plurality of pixels, an analog signal of the plurality of pixels;

an analog-to-digital converter that performs analog-to-digital conversion processing for converting the analog signal into a digital signal; and a conversion control unit that controls the analog-to-digital conversion processing of the plurality of pixels included in a predetermined pixel block according to a difference between the digital signal of a representative pixel in the predetermined pixel block of the plurality of pixel blocks and a predetermined reference value.

(2) The imaging apparatus according to (1) described above, in which the conversion control unit performs control such that, for a first pixel block in which a difference between the digital signal of the representative pixel and the reference value is a predetermined threshold or more, the analog-to-digital conversion processing of the plurality of pixels included in the first pixel block is performed by the analog-to-digital converter to generate the digital signal of the plurality of pixels, and for a second pixel block in which a difference between the digital signal of the representative pixel and the reference value is less than the threshold, the analog-to-digital conversion processing of the plurality of pixels included in the second pixel block is not performed by the analog-to-digital converter.

(3) The imaging apparatus according to (2) described above, in which the conversion control unit performs control such that, even for the second pixel block in which the difference between the digital signal of the representative pixel and the reference value is less than the threshold, if a difference between the digital signal of the representative pixel in a pixel block in the periphery of the second pixel block and the reference value is the threshold or more, the analog-to-digital conversion processing of the plurality of pixels included in the second pixel block is performed by the analog-to-digital converter to generate the digital signal of the plurality of pixels.

(4) The imaging apparatus according to any one of (1) to (3) described above,
in which the conversion control unit includes an imaging mode switching unit that performs switching between an interleaving imaging mode in which the analog-to-digital conversion processing is performed to generate the digital signal by the analog-to-digital converter for only the representative pixel of the plurality of pixel blocks, and a region control imaging mode in which the analog-to-digital conversion processing of the plurality of pixels included in the predetermined pixel block is performed by the analog-to-digital converter according to the difference between the digital signal of the representative pixel and the reference value.

(5) The imaging apparatus according to (4) described above,
in which the conversion control unit includes
an interleaving decision unit that outputs, as a decision result, coordinates of a pixel block in which a difference between the digital signal of the representative pixel generated in the interleaving imaging mode and the reference value is a predetermined threshold or more, and
a coordinate setting unit that sets coordinates of the pixel block for which the analog-to-digital conversion processing is performed in the region control imaging mode on the basis of the decision result.

(6) The imaging apparatus according to (4) or (5) described above,
in which the conversion control unit controls an exposure time of the plurality of pixels included in the predetermined pixel block in the region control imaging mode on the basis of the digital signal of the representative pixel generated in the interleaving imaging mode.

(7) The imaging apparatus according to any one of (4) to (6) described above,
in which the conversion control unit performs operation by the region control imaging mode at a frame rate different from that of the interleaving imaging mode, on the basis of the digital signal of the representative pixel generated in the interleaving imaging mode for a plurality of moving image frames arrayed in time series.

(8) The imaging apparatus according to any one of (1) to (7) described above,
in which the reference value is a preset fixed value.

(9) The imaging apparatus according to any one of (1) to (8) described above,
in which the reference value is a value set from values of corresponding pixels in moving image frames arrayed in time series.

(10) The imaging apparatus according to any one of (1) to (9) described above,
in which the analog-to-digital converter performs the analog-to-digital conversion processing in units of a pixel, corresponding to each of the pixels.

(11) The imaging apparatus according to any one of (1) to (9) described above,
in which the analog-to-digital converter performs the analog-to-digital conversion processing in units of a region in which a plurality of the pixel is collected.

(12) The imaging apparatus according to any one of (1) to (9) described above,
in which the analog-to-digital converter performs the analog-to-digital conversion processing in units of a column, the pixel being collected for each of the column.

(13) The imaging apparatus according to any one of (1) to (12) described above,
in which the imaging element generates the analog signal by nondestructive reading.

(14) An imaging control method in an imaging apparatus, the imaging apparatus including an imaging element that generates, for a plurality of pixel blocks each including a plurality of pixels, an analog signal of the plurality of pixels, and an analog-to-digital converter that performs analog-to-digital conversion processing for converting the analog signal into a digital signal, the imaging control method including:
an interleaving imaging step of causing the analog-to-digital converter to perform the analog-to-digital conversion processing only for a representative pixel in the plurality of pixel blocks to generate the digital signal; and
a region control imaging step of causing the analog-to-digital converter to perform the analog-to-digital conversion processing of the plurality of pixels included in a predetermined pixel block according to a difference between the digital signal of the representative pixel and a predetermined reference value.

(15) The imaging control method according to (14) described above,
in which an exposure time of the plurality of pixels included in the predetermined pixel block is controlled in the region control imaging step on the basis of the digital signal of the representative pixel generated in the interleaving imaging step.

REFERENCE SIGNS LIST

100 Imaging apparatus
110 Lens group
120 Solid-state imaging unit
121 Imaging element
125 Analog-to-digital converter
131 Imaging mode switching unit
132 Coordinate setting unit
133 White balance control unit
134 Auto exposure control unit
135 Interleaving decision unit
141 Interleaving imaging memory
142 Region control imaging memory
151 Signal processing part
152 Display unit
153 Operation unit
154 Recording unit
155 Power supply unit
190 Bus line

The invention claimed is:
1. An imaging apparatus, comprising:
an imaging element configured to generate analog signals for each of a plurality of pixel blocks, wherein each of the plurality of pixel blocks includes a plurality of pixels;
an analog-to-digital converter configured to perform analog-to-digital conversion processing for a representative pixel of the plurality of pixels of each of the plurality of pixel blocks to convert an analog signal of the representative pixel of each of the plurality of pixel blocks into a digital signal; and circuitry configured to:
control, for a first pixel block of the plurality of pixel blocks, the analog-to-digital conversion processing of the plurality of pixels of the first pixel block to generate digital signals of the plurality of pixels of the first pixel block,
wherein a difference between the digital signal of the representative pixel of the first pixel block and a specific reference value is greater than or equal to a specific threshold value;
control, for a second pixel block of the plurality of pixel blocks, the analog-to-digital conversion processing of the plurality of pixels of the second pixel block such that the analog-to-digital conversion processing is not performed for the plurality of pixels of the second pixel block,
wherein a difference between the digital signal of the representative pixel of the second pixel block and the specific reference value is less than the specific threshold value; and
control, for a third pixel block of the plurality of pixel blocks, the analog-to-digital conversion processing of the plurality of pixels of the third pixel block to generate digital signals of the plurality of pixels of the third pixel block, wherein
the third pixel block is in a periphery of the first pixel block, and
a difference between the digital signal of the representative pixel of the third pixel block and the specific reference value is less than the specific threshold value.

2. The imaging apparatus according to claim 1, wherein the circuitry is further configured to perform switching between an interleaving imaging mode and a region control imaging mode,
the interleaving imaging mode corresponds to an imaging mode in which the analog-to-digital conversion processing is performed to generate the digital signal for the representative pixel of each of the plurality of pixel blocks, and
the region control imaging mode corresponds to an imaging mode in which the analog-to-digital conversion processing for the plurality of pixels of the first pixel block is performed based on the difference between the digital signal of the representative pixel of the first pixel block and the specific reference value.

3. The imaging apparatus according to claim 2, wherein the circuitry is further configured to:
output, as a decision result, coordinates of the first pixel block; and
set the coordinates of the first pixel block based on the decision result, wherein the first pixel block corresponds to a block for which the analog-to-digital conversion processing is performed in the region control imaging mode.

4. The imaging apparatus according to claim 2, wherein the circuitry is further configured to control an exposure time of the plurality of pixels of the first pixel block in the region control imaging mode based on the digital signal of the representative pixel of the first pixel block.

5. The imaging apparatus according to claim 2,
wherein the circuitry is further configured to perform operation by the region control imaging mode, at a frame rate different from that of the interleaving imaging mode, based on the digital signal of the representative pixel generated in the interleaving imaging mode for a plurality of moving image frames arrayed in time series.

6. The imaging apparatus according to claim 1, wherein the specific reference value is a preset fixed value.

7. The imaging apparatus according to claim 1, wherein the specific reference value corresponds to values of the plurality of pixels in moving image frames, and
the moving image frames are in time series.

8. The imaging apparatus according to claim 1, wherein the analog-to-digital converter is further configured to perform the analog-to-digital conversion processing in units of a pixel of the plurality of pixels.

9. The imaging apparatus according to claim 1, wherein the analog-to-digital converter is further configured to perform the analog-to-digital conversion processing in units of a region associated with the plurality of pixels.

10. The imaging apparatus according to claim 1, wherein the analog-to-digital converter is further configured to perform the analog-to-digital conversion processing in units of a column associated with a pixel of the plurality of pixels.

11. The imaging apparatus according to claim 1,
wherein the imaging element is further configured to generate the analog signals by nondestructive reading.

12. An imaging control method, comprising:
in an imaging apparatus that includes an imaging element, analog-to-digital converter, and circuitry, wherein the imaging element is configured to generate analog signals for each of a plurality of pixel blocks, and each of the plurality of pixel blocks includes a plurality of pixels:
performing, by the analog-to-digital converter, analog-to-digital conversion processing for a representative pixel of the plurality of pixels of each of the plurality of pixel blocks to convert an analog signal of the representative pixel of each of the plurality of pixel blocks into a digital signal;
controlling, by the circuitry, for a first pixel block of the plurality of pixel blocks, the analog-to-digital conversion processing of the plurality of pixels of the first pixel block to generate digital signals of the plurality of pixels of the first pixel block,
wherein a difference between the digital signal of the representative pixel of the first pixel block and a specific reference value is greater than or equal to a specific threshold value;
controlling, by the circuitry, for a second pixel block of the plurality of pixel blocks, the analog-to-digital conversion processing of the plurality of pixels of the second pixel block such that the analog-to-digital conversion processing is not performed for the plurality of pixels of the second pixel block,
wherein a difference between the digital signal of the representative pixel of the second pixel block and the specific reference value is less than the specific threshold value; and
controlling, by the circuitry, for a third pixel block of the plurality of pixel blocks, the analog-to-digital conversion processing of the plurality of pixels of the third pixel block to generate digital signals of the plurality of pixels of the third pixel block, wherein
the third pixel block is in a periphery of the first pixel block, and
a difference between the digital signal of the representative pixel of the third pixel block and the specific reference value is less than the specific threshold value.

13. The imaging control method according to claim 12, further comprising controlling, by the circuitry, an exposure time of the plurality of pixels of the first pixel block in a region control imaging mode based on the digital signal of the representative pixel of the first pixel block.

* * * * *